(12) United States Patent
Schreier et al.

(10) Patent No.: US 12,472,508 B2
(45) Date of Patent: Nov. 18, 2025

(54) METHOD AND APPARATUS FOR ISOLATING DESIRED CELLS FROM SUSPENSIONS WITH NON-MAGNETIC BIOLOGICAL MATERIALS

(71) Applicants: SANOLIBIO CO., LTD., Prakan (TH); Stefan Schreier, Walderbach (DE)

(72) Inventors: Stefan Schreier, Walderbach (DE); Ulrich Lang, Penang (MY)

(73) Assignee: SANOLIBIO CO .. LTD., Prakan (TH)

( * ) Notice: Subject to any disclaimer, the term of this patent is extended or adjusted under 35 U.S.C. 154(b) by 874 days.

(21) Appl. No.: 17/428,842

(22) PCT Filed: Feb. 6, 2020

(86) PCT No.: PCT/EP2020/053013
§ 371 (c)(1),
(2) Date: Aug. 5, 2021

(87) PCT Pub. No.: WO2020/161252
PCT Pub. Date: Aug. 13, 2020

(65) Prior Publication Data
US 2022/0184634 A1 Jun. 16, 2022

(30) Foreign Application Priority Data
Feb. 6, 2019 (EP) .................... 19155839

(51) Int. Cl.
*C12M 1/00* (2006.01)
*B03C 1/01* (2006.01)
(Continued)

(52) U.S. Cl.
CPC .............. *B03C 1/01* (2013.01); *B03C 1/0332* (2013.01); *B03C 1/288* (2013.01); *B03C 1/30* (2013.01);
(Continued)

(58) Field of Classification Search
CPC ......... B03C 1/01; B03C 1/0332; B03C 1/288; B03C 1/30; B03C 2201/18;
(Continued)

(56) References Cited

U.S. PATENT DOCUMENTS

| | | | |
|---|---|---|---|
| 4,452,773 | A | 6/1984 | Molday |
| 4,654,267 | A | 3/1987 | Ugelstad et al. |

(Continued)

FOREIGN PATENT DOCUMENTS

| | | | |
|---|---|---|---|
| CN | 104928280 A | | 9/2015 |
| CN | 105734043 A | | 7/2016 |

(Continued)

OTHER PUBLICATIONS

Schreier, Stefan et al., "Advances in rare cell isolation: an optimization and evaluation study," Journal of Translational Medicine, vol. 15, No. 1, Jan. 5, 2017.

(Continued)

*Primary Examiner* — Rebecca M Fritchman
(74) *Attorney, Agent, or Firm* — Day Pitney LLP; George Chaclas; Anthony A. Kassas

(57) ABSTRACT

The present invention concern a method and a device for the isolation of non-magnetic cells from a heterogeneous sample solution containing biological material including desired and undesired cells. The method comprises the steps of: —adding magnetic or magnetizable particles to the sample, wherein said particles have sizes in a range from 100 nm to 4 µm and exhibit surface components which support specific association with target cells, wherein said target cells comprise are either said desired or said undesired cells; —decreasing said external magnetic field gradient; —incubating said sample solution with said magnetic particles to obtain a magnetized cell fraction; —washing said magnetized cell fraction using a washing solution to (Continued)

reduce non-specific binding; —increasing said external magnetic field gradient; —separating said magnetized cell fractionation of target cells from said sample; wherein said sample solution is subjected to an external magnetic field gradient throughout said adding, incubating, washing and separating steps, and wherein said sample solution is rotated at least during said adding, incubating and washing steps.

10 Claims, 6 Drawing Sheets

(51) Int. Cl.
| | |
|---|---|
| *B03C 1/033* | (2006.01) |
| *B03C 1/28* | (2006.01) |
| *B03C 1/30* | (2006.01) |
| *C12M 3/04* | (2006.01) |
| *G01N 33/543* | (2006.01) |

(52) U.S. Cl.
CPC ............ *C12M 27/10* (2013.01); *C12M 47/04* (2013.01); *B03C 2201/18* (2013.01); *B03C 2201/26* (2013.01)

(58) Field of Classification Search
CPC ... B03C 2201/26; C12M 27/10; C12M 47/04; G01N 33/54333
See application file for complete search history.

(56) References Cited

U.S. PATENT DOCUMENTS

| | | | |
|---|---|---|---|
| 4,664,796 | A | 5/1987 | Graham et al. |
| 4,884,088 | A | 11/1989 | Mauchan |
| 5,186,827 | A | 2/1993 | Liberti et al. |
| 5,200,084 | A | 4/1993 | Liberti et al. |
| 5,597,531 | A | 1/1997 | Liberti et al. |
| 6,020,210 | A | 2/2000 | Miltenyi |
| 7,387,897 | B2 | 6/2008 | Wognum et al. |
| 2003/0127396 | A1* | 7/2003 | Siddiqi ................ B03C 1/0335 210/695 |
| 2012/0132593 | A1* | 5/2012 | Murthy .................. C12M 47/02 209/636 |
| 2016/0186165 | A1* | 6/2016 | Dose ........................ B03C 1/01 435/173.9 |

FOREIGN PATENT DOCUMENTS

| | | |
|---|---|---|
| CN | 108546676 A | 9/2018 |
| DE | 68919715 A1 | 4/1995 |
| DE | 102007043281 A1 | 9/2007 |
| DE | 102015013851 B3 | 10/2016 |
| EP | 0942766 A1 | 9/1999 |
| EP | 1151297 A1 | 11/2001 |
| WO | 96/026782 A1 | 9/1996 |
| WO | 2002/071929 A2 | 9/2002 |
| WO | 2005/028663 A2 | 3/2005 |
| WO | 2014/058868 A1 | 4/2014 |

OTHER PUBLICATIONS

Johannes, Lindner et al., "A hybrid method for combining High-Gradient Magnetic Separation and centrifugation for a continuous process," Separation and Purification Technology, vol. 131, Apr. 18, 2014, pp. 27-34.
International Search Report and Written Opinion issued in corresponding international patent application No. PCT/EP2020/053013, mailed Apr. 21, 2020, 10 pages.
Fachin, Fabio et al., "Monolithic chip for highthroughput blood cell depletion to sort rare circulating tumor cells." Scientific Reports 7.1 (2017): 10936.
Allard, W. Jeffrey et al., "Tumor cells circulate in the peripheral blood of all major carcinomas but not in healthy subjects or patients with nonmalignant diseases." Clinical Cancer Research 10.20, 2004, pp. 6897-6904.
Raimondi, Cristina et al., "Circulating tumor cells isolation : the post-EpCAM era," Chinese Journal of Cancer Research 27.5, 2015, 461.
Waseem, Shahid et al., "Buffer-Optimized HIgh Gradient Magnetic Separation," Jounral Of Magnetics, 21.1, 2016, pp. 125-132.
Fouriki, A., "Evaluation of the magnetic field requirements for nanomagnetic gene transfection", Nano Rev., 2010, vol. 1, pp. 1-5.

* cited by examiner

METHOD AND APPARATUS FOR ISOLATING DESIRED CELLS FROM SUSPENSIONS WITH NON-MAGNETIC BIOLOGICAL MATERIALS

CROSS-REFERENCE TO RELATED APPLICATIONS

This application is a U.S. national stage application under 35 U.S.C. 371 of co-pending International Application No. PCT/EP2020/053013 filed on Feb. 6, 2020, which in turn claims priority to EP Application No. 19155839.4 filed on Feb. 6, 2019, the contents of which are incorporated by reference herein in their entirety for all purposes. The present disclosure relates to a method and an apparatus for the isolation of desired cells from a sample of non-magnetic biological materials.

TECHNICAL BACKGROUND

In the field of biological-medical research, purification of biological materials from a heterogeneous particle suspension is often required for various analysis methods.

There is great interest in the enrichment of cells and single cellular organisms including bacteria and viruses, but also of cell fragments such as proteins, peptides or nucleic acids.

For simplicity reasons, the term "cells" is used herein in the widest sense and represents all multi-cellular and single cell organisms, but also cell fragments and viruses, as well as individual bio-molecules, such as proteins, peptides or nucleic acids.

For improved separation or the generation of separability of difficult or inadequately separable biological materials a variety of labelling methods is available and are often based on so-called affinity reactions. Most common separation technology is based on labelling of target cells or cell fragments with fluorescence dyes or synthetic magnetic particles. The so called magnetic cell separation technology stands out for its simplicity and costs when compared to the so called fluorescence activated cell sorting.

The magnetic separation process is carried out by labelling target materials with receptor or ligand conjugated magnetic particles, respectively. The term target material shall indicate all substances and molecular structures that may associate with the biological material to form a specific binding pair.

The term specific binding pair represents a pair or combination of substances that exhibit binding tendency and includes elements such as cellular components, bio-specific ligands and receptors. In this sense, the labelling of a target material is carried out by association of specific binding pairs consisting of ligand and receptor. The term "ligand" denotes the component bound to the target material being capable of specific binding and comprising antigens or haptens that are defined by at least one epitope or other characteristic determinants. The term "receptor" denotes the labelling target or a group thereof with biospecific affinity to an exclusive ligand. Possible receptors may be monoclonal antibodies or fragments thereof, specific binding proteins such as Protain A or G, the biotin streptavidin binding pair, Aptamers, nucleic acids etc. Preferably, bio-specific binding is non-covalent in nature assuming high binding kinetics and possibly reversibility.

We shall refer to descriptions of state of the art preparation of magnetic particles suited for magnetic cell separation technology in U.S. Pat. Nos. 4,884,088, 4,654,267, 4,452, 773 and 5,597,531. Thereafter, the particle core consists of magnetic materials, such magnetite a ferromagnetic ironoxide. A crystal grain size of at least 30 nm is required for the generation of the so called para-magnetic behavior. Such magnetic materials are often referred to as magnetic susceptible, magnetizable, or superparamagnetic due to high magnetic polarization only when influenced by an external magnetic field. This magnetic property prevents particle aggregation during and after the magnetic separation process due to an insignificant degree of residual magnetism. Furthermore, the magnetic particle composition determines in parts the so called enrichment efficiency. The magnetic particles possess a maximal magnetic susceptibility that is governed by the amount and size of the ferromagnetic crystals in the core of the particle.

In general, the magnetic separation technology can be divided into intrinsic and external procedures. As mentioned earlier, magnetic particles smaller than 100 nm produce only very small magnetic moments in presence of an external magnetic field source. However, the small particle size relates to a beneficial ratio between reactive surface and particle volume or the amount of particles. Consequently, using so called nano-particles with diameters ranging between 30 nm and 100 nm, so called high gradient magnetic separation system are required for magnetic fractioning and have been described for example in U.S. Pat. Nos. 4,664,796, 5,200,084, WO 96/26782A and EP 0 942 766 A.

Commercially available intrinsic cell separation systems for general purpose cell separation employing magnetic nano-particles measuring 50 nm in diameter have been developed by the company Miltenyi AG. Hereby, a so called magnetic separation column is being used consisting of a ferromagnetic matrix placed in a non-magnetic container. For the purpose of magnetic separation, the separation column is introduced into strong external magnetic field. High magnetic field gradients within the separation chamber can be expected measuring up to 100 Tesla/cm. The procedure is complicated when compared to external magnetic separating procedures preventing fast protocols, hampering automation and increasing costs. Moreover, the magnetic separation matrix produces a high reactive surface area that may generate stress onto viable cells or increase non-specific binding of cells with the reactive surface.

As to avoid the disadvantages of magnetic separation columns and enjoy the benefits of using nano-particles, external high gradient magnetic separation systems have been developed. Hereby, focus was set on external specialized magnet configurations, such as for example the quadrupole or hexapole configuration as described for example in U.S. Pat. No. 5,186,827. Such magnets generate field gradients in range of 1.5 Tesla/cm, yet require larger magnetic particles having a size (diameter) in a range from 150 nm to 4 µm.

Using magnetic particles exceeding 500 nm in diameter allows employment of very simple and less costly magnet separation set up thereby placing an incubation container adjacent to a simple permanent magnet. Commercially available systems are provided for example by Dynal Inc. named Dynal MPC1.

One major aspect to advance magnetic particle based separation systems is the improvement of the enrichment quality and essentially means to reduce loss of desired cells and maximize the purity thereof. The enrichment process usually consists of an incubation phase for magnetic labelling of target material and the subsequent magnetic separation. Commonly, the incubation is carried out at rest when using particles not exceeding 150 nm or occasional mixing in case of using larger particles with tendency of sedimentation.

Patent DE 10 2015 013 851 describes an magnetic labelling procedure, in which particles are incubated with biological material in the presence of a magnetic field and in rotation of the incubation container. The process was shown to yield increased magnetic labelling efficiency and relates to higher amounts of target-bound magnetic particles within shorter time intervals when compared to incubation at rest. The terminology "dynamic magnetic labelling" was later introduced by Schreier et al. 2017 as to describe an active form of magnetic labelling when compared to the rather passive incubation at rest. It was suspected that the rotation of the incubation container in the presence of the magnetic field forced and increased collision of particles with target material and consequently accelerated reaction kinetics. The term "collision behavior" shall define modes of movement that are responsible for the generation of all kinds of bindings between a reaction pair of similar as well as different types. In general, collision behavior may be characterized by the linear moment of one magnetic particle, the frequency or amount of collisions per time interval between two equal or two different reaction pairs, the sum of collisions over a certain incubation duration of one reactant with other different reactants and the duration of contact between a reaction pair.

Of particular interest for pharmaceutical and biomedical research and development is the isolation of rare cells from a heterogeneous cell suspension. So for example, the isolation, quantification and characterization of certain rare cells or rare cell populations in a blood sample can be of assistance at real-time for independent and fast provision of pathological diagnosis. One aspect of interest is the enrichment of so called circulating tumor cells (CTCs), in particular the detection of CTCs in peripheral venous blood in carcinoma, melanoma or sarcoma patients. CTCs may have the potential to function as independent early stage cancer biomarker that in parts may allow replacement of invasive investigations of tissue biopsy.

A major problem when translating circulating rare cells (CRCs) as biomarker into clinical practice is inefficient isolation and selection. When relying on magnetic separation technology, one may choose between positive and negative selection. When selecting positively, the desired cells are magnetically labelled, whereas in negative selection, the undesired cells are magnetically labelled. Negative selection has the advantage of receptor independence or in other words low selectivity for particular cell types and consequently, is the better choice when facing a cell mixture with unknown or highly variable desired cell populations thus, improves sensitivity.

The term "enrichment dilemma" denotes the problem of insufficient enrichment in particular related to the isolation of rare cells. Insufficient enrichment shall mean that high purities are required yet only achieved on costs of significant losses of the analyte. In contrast, rarity implies the requirement of no or low level losses of the analyte that has been achieved only by accepting low purity. Enrichment efficiency is measured in log numbers and denotes the ratio between the purity of the analyte before and after enrichment, respectively. With respect to the separation of rare cells from blood, the purity shall relate to nucleated cells and excludes red blood cells and thrombocytes. So for example, the purity of 10 rare cells in 1 ml (milliliter) blood measures 0.00017% assuming $6 \times 10^6$ leucocytes per ml. A theoretical enrichment efficiency of 5 log would produce a purity after enrichment of 16.7%.

The quality of magnetic separation technology purposed for the enrichment of rare cells is determined by parameters that include preparation time, loss of desired cells, capture efficiency, enrichment efficiency, sample costs and capacity of process automation. Current state of the art technology allows processing of sample volumes of several milliliters, do not seem to loose desired cells and yield a low carry-over of undesired cells in range of 1000 to 5000 cells per ml blood. An advanced system has been introduced in 2017 by Fachin and co-workers, named CTC-iCHIP (Fachin, Fabio, et al. "Monolithic chip for highthroughput blood cell depletion to sort rare circulating tumor cells." Scientific reports 7.1(2017): 10936). The CTC-iCHIP provides a solution to the enrichment of rare cells by separation of red blood cells from white blood cells then white blood cells from rare cells via three chip modules in combination. Nevertheless, the system was reported with inherent bias towards rare cells in size similar to white blood cells thereby loosing up to 30% of desired cells in the first separation step, and consequently having failed to solve the enrichment dilemma. The gold standard of enrichment of circulating tumor cells (CTCs) is based on positive selection of circulating epithelial cells using the CellSearch system (Allard, W. Jeffrey, et al. "Tumor cells circulate in the peripheral blood of all major carcinomas but not in healthy subjects or patients with nonmalignant diseases." Clinical cancer research 10.20 (2004): 6897-6904). Also, in case of the CellSearch System, high recovery in range of 80 to 90% and high purity after enrichment (suited for microscopy) has been reported and unlike the CTC-iCHIP, the CellSearch system has also been independently validated. Nevertheless, the system is limited to epithelial cells expressing the CD326 marker at sufficiently high rates, thus missing out a greater part of diagnostic information from epithelial cells with low expression of CD326 as well as non-epithelial cell types. This high selectivity was reasoned to be cause of the low sensitivity towards early stage cancer patients (Raimondi, Cristina, Chiara Nicolazzo, and Angela Gradilone. "Circulating tumor cells isolation: the "post-EpCAM era", Chinese Journal of Cancer Research 27.5 (2015): 461). Further advancement in enrichment was reported by Schreier and co-workers (Schreier et al. 2017) introducing the so called dynamic magnetic labelling procedure to magnetic cell separation technology. The improvement in its principle concerned the expense in particles and the reduction in process time and to a much lesser extend the enrichment efficiency for still showing losses of desired cells when pushing to system to higher capture efficiencies (Schreier, Stefan, et al. "Advances in rare cell isolation: an optimization and evaluation study." Journal of Translational Medicine 15.1 (2017): 6). In general, current state of the art technology has not yet sufficiently addressed the needs of rare cell enrichment in particular with regard to loss of desired cells, thus enrichment dilemma and costs of commercial available system.

One particular problem is excess background noise caused by carry over leukocytes and negatively affects the analytical sensitivity and specificity of most analytical methods. The reduction in back ground noise means a significant amount of extra effort in costs, complexity, skill and time. Often, repetition of the enrichment procedure is required or using isolation technology in combination of with micromanipulation methodology. For molecular analysis, the 1% purity criterion applies. As a calculation example, a 10 ml blood sample from an early or treated cancer patient may contain 10 circulating tumor cells (CTCs) thus, 10 desired cells in roughly $6 \times 10^7$ nucleated and $6 \times 10^{10}$ total cells (including red blood cells and platelets). When applying the 1% purity criterion, a carry-over of non-desired nucleated cells shall be limited to 1000 cells and corresponds to 4.77 log depletion of undesired cells. A near 5 log depletion can be considered technological challenging and may be reason for the slow progress and absence of success of cell-based liquid biopsy use in early stage cancer molecular analysis. In this sense, advancement in the field means to achieve near 5 log depletion without loosing desired cells and develop faster and cheaper assays. Another aspect of the enrichment dilemma in magnetic cell separation relates to the reduction of loss of desired biological material. Improvements mostly relate to the reduction of non-specific binding to surfaces such as for example in HGMS separation chambers (DE68919715, U.S. Pat. No. 6,020,210, DE102007043281, Lin et al. 2013), the increase in specificity of reaction pairs (U.S. Pat. No. 662,398, U.S. Pat. No. 7,387,897B2) or to subsequent special treatment of the separated sample as to reverse non-specific binding (WO2002071929A2).

A major aspect of the cell loss in magnetic separation technology is the non-specific binding of biological material to magnetic particles. The characterization of non-specific binding is often hampered by the multitude of unknown system parameters. Nevertheless, non-specific binding seems to be reversible and non-reversible. Hereby, the surface composition of biological material such as cell membranes play an important role. Reversible non-specific binding between bio-molecules is mostly caused by electrostatic attraction and can be reduced by respective washing steps. Moreover, reversible non-specific binding can be minimized using blocking reagents in a blocking step before the actual incubation of biological material with magnetic particles, during the incubation and also during magnetic separation.

In contrast to reversible non-specific binding, protein interaction play role in irreversible non-specific binding. Also, cross reactivity between receptors with various ligands may be cause of undesired binding. Therefore, prior knowledge about receptor ligand specificity is mandatory. Moreover, the so called Fc-fragment of antibodies is a ligand to various cell types in human blood causing undesired binding of antibody conjugated magnetic particles. Therefore, a blocking step of Fc-receptors is commonly applied prior to incubation with magnetic particles or primary antibodies. Other than that, the use of the recombinant antibody fragments has been recommended.

The magnetic separation methods described in the prior art do not provide satisfactory technological approaches for an all-embracing isolation of circulating rare cells (CRCs) found at concentration levels from a few to a few thousand cells per sample, in particular for cell fragments and cells with high ligand heterogeneity and plasticity, as for example circulating tumor cells (CTCs).

TECHNICAL PROBLEM

According to patent DE 10 2015 013 851, the dynamic magnetic labelling process yields increased labelling of biological material with magnetic particles when compared to common incubation modes at rest or by mixing. However, the method fails to address the reduction in non-specific binding. Therefore, the technical problem of the present disclosure aims at the advancement of the formerly developed methods as described in patent DE 10 2015 013 851 in such a way that more efficient enrichment is achieved by reducing non-specific binding and simultaneously reducing process duration time. Hereby, enrichment in efficiency shall mean to increase magnetic labelling in favor of specific binding.

BRIEF DESCRIPTION OF THE DISCLOSURE

The present disclosure intends to resolve the above-described enrichment dilemma.

Accordingly, the present disclosure is directed to a method for the isolation of non-magnetic cells from a heterogeneous sample solution containing biological material including desired and undesired cells, comprising the steps of:
  adding magnetic or magnetizable particles to the sample, wherein said particles have sizes in a range from 100 nm to 4 µm and exhibit surface components which support specific association with target cells, wherein said target cells comprise are either said desired or said undesired cells;
  decreasing said external magnetic field gradient;
  incubating said sample solution with said magnetic particles to obtain a magnetized cell fraction;
  washing said magnetized cell fraction using a washing solution to reduce non-specific binding;
  increasing said external magnetic field gradient;
  separating said magnetized cell fractionation of target cells from said sample;
wherein said sample solution is subjected to an external magnetic field gradient throughout said adding, incubating, washing and separating steps, and
wherein said sample solution is rotated at least during said adding, incubating and washing steps.

An "external magnetic field gradient" in the sense of the present disclosure is an artificially created magnetic field gradient, i.e. a field gradient in addition to the natural field gradient of the earth's magnetic field, created by one or more magnets arranged outside external to the sample.

The method of the disclosure is conducted in the perpetually presence of a magnetic field gradient that has direct influence on a sample solution containing magnetic or magnetizable particles and is adjustable in strength and adapted to each of said steps of the magnetic separation procedure and prevents the formation of non-specific binding.

Preferably, said external magnetic field gradient applied to said sample solution is varied between said adding, incubating, washing and separating steps. In a preferred embodiment, a strong external magnetic field gradient is established before said adding step. The strong magnetic field gradient generates high kinetic energy of magnetic particles within the sample solution being sufficient to inhibit non-specific binding. After said adding step and before said incubating step, the magnetic field gradient is decreased to a medium magnetic field gradient, lower than said strong magnetic field gradient of the adding step. However, the medium magnetic field gradient generates a low magnetic particle kinetic energy supporting binding of any kind, yet strong enough to be in favor of specific binding and causing magnetic fractionation after a longer period that determines the incubation cycle time. After said washing step, the magnetic field gradient is increased again to establish a strong magnetic field gradient during said separating step. The strong magnetic field grading of the separating step is at least as high as but preferably higher than the magnetic field gradient of the adding step. It should be high enough to enable fractionation of very low magnetically susceptible target material within given separation time.

Preferably said sample solution is provided in a sample container which is rotated concentrically at different speeds during said adding, incubating and washing steps. The rotational speed in each step is also chosen with the objective to prevent the formation of non-specific binding.

Stated differently, the present disclosure discloses a method for isolating desired cells from a sample of non-magnetic biological material that consists of a suspension of desired and undesired cells, the said method being the steps:

Resuspension of cells in an incubation buffer. In a preferable embodiment, the incubation buffer shall be friendly to cell physiology as well as prevent non-specific binding;

Addition of magnetic or magnetizable particles to a fluid sample in the presence of a high magnet field gradient, wherein the particles exhibit surface entities that enable specific association with target cells, wherein the target cells constitute desired or undesired cells;

Incubation of the sample in the presence of a magnetic field gradient of reduced strength when compared to the high magnetic field gradient applied during addition of magnetic particles;

Washing of the magnetically labelled cell fraction with a washing solution. In a preferable embodiment, the washing solution shall not cause harm to cells over a period of several minutes and potentially reverse non-specific binding;

Magnetic separation of target cells from a sample in the presence of a high magnetic field gradient that is higher than the magnetic field gradient applied during incubation.

Thus, the method of the present disclosure is based on commonly employed steps in magnetic separation technology that include magnetic particle addition, incubation, washing of the magnetic particle fraction and the magnetic separation of target cells. The present disclosure is characterized by the adjustment of certain different magnetic field gradients at each step starting with the addition of magnetic particles. In contrast to the state of the art, the procedure of magnetic field variation in dependence of individual process steps allows dramatic reduction in non-specific binding.

As initially stated, the term "cell" should be construed broadly in the present disclosure including but not limited to cell fragments, cell organelles, all eukaryotic and prokaryotic cells, nucleic acids, and in the broadest sense biological material.

Particularly, the term "cell" shall include circulating tumor cells (CTCs), leukocytes, mature non-hematopoietic cells, mesenchymal progenitor and stem cells and embryonal stem cells, primitive as well as matured bone marrow stromal cells, cancer cells, somatic cells, cells in suspension, in-vivo tissue or ex-vivo and all nucleated cells. The term rare cells denotes all nucleated as well as non-nucleated as well as enucleated cells in various bodily fluids as well as tissue. In blood, rare cells shall be characterized for the absence of the common leukocyte antigen CD45 and includes all hematopoietic as well as non-hematopoietic cell types.

In the present method, the term "desired cells" shall indicate cells or cell components that ought to be isolated from the rest of the heterogeneous biological material. The term "undesired cells" comprises those cells or cell components in a sample suspension that are not isolated in the process and therefore, constitute the rest of the sample suspension.

The term "target cells" describes those cells intended to be labelled with magnetic or magnetizable particles via specific binding. In case of target cells being desired cells, the present disclosure describes a process of positive selection. In case of target cells being undesired cells, the present disclosure describes a process of negative selection.

The method of the present disclosure can be carried out using magnetic particles that exhibit permanent magnetization or using magnetizable particles that develop a magnetic moment only in the presence of a magnetic field.

The terms "small" and "large" with respect to magnetic particles are used as followed: small particles denotes particles with diameters up to 150 nm and larger ones with diameters greater 150 nm. With respect to cells, diameters of small cells measure up to 10.4 micrometer, diameters of medium sized cells range between 10.5 to 13.5 micrometer and large cells measure greater 13.5 micrometer in diameter.

The magnetic labelling and separation procedure of the present disclosure is carried out using at least two different strengths of magnetic field gradients. The addition of magnetic particles is carried out in the presence of a strong magnetic field gradient, whereas the subsequent incubation of the sample with magnetic particles is carried out in the presence of medium magnet field gradient that is weaker than the gradient used during addition of the magnetic particles. However, a higher magnetic field gradient is required during magnetic separation of target cells when compared to the magnetic field gradient used during incubation.

Preferably, the sample is rotated during magnetic labelling at various rotation speeds. In a preferable embodiment of the disclosure, the sample is rotated at higher speed during addition of the magnetic particles and slower during incubation with magnetic particles.

In a preferable embodiment of the disclosure, the incubation step consists of several incubation cycles, wherein each incubation cycle comprises;

a magnetic labelling step at slow rotational speed of the incubation container that is slower than a fast rotational speed during addition of the particles for the purpose of generating a magnetic particle bound cell fraction; and a mixing step to establish an equal distributions in the heterogeneous sample suspension as present said magnetic labelling step.

In the step of magnetic labelling, the magnetic particle-bound cell fraction will be attracted towards the highest magnetic field gradient as such to the incubation container wall nearest to the magnet. The following mixing step at each incubation cycle allows re-distribution of the cell fraction in the suspension as to regain efficient particle-cell collision as such, increases the specific labelling with magnetic particles in favor of non-specific binding. The mixing can be carried out by various means that include but are not limited to pipetting and dispensing of the sample fluid using a micropipette, or via vortexing.

In principle, the mixing as part of one incubation cycle can be carried out in the absence of a magnetic field gradient. In a preferred embodiment of the method of the present disclosure, the mixing is carried out in the presence of a weak magnet field gradient that is lower than the gradient applied during the prior magnetic labelling step. Accordingly, in a preferred embodiment, said magnetic field gradient is further decreased between said magnetic labelling step and said mixing step and, if an incubation cycle is repeated, increased again before the subsequent labelling step. Preferably, the mixing step is carried out at high rotation speed that is higher than the rotation speed applied during magnetic labelling that allows efficient resuspension of cells and magnetic particles. Typically, the incubation with magnetic particles comprises 3 to 10 incubation cycles.

In a preferred embodiment of the method of the present disclosure, the washing step comprises one or several washing cycles, wherein each washing cycle comprises the following steps:

removal of the supernatant from the magnetically separated cell fraction;

resuspension of the magnetically separated cell fraction in iso-osmolaric washing solution that is low or void of protein and in the presence of a weak magnetic field gradient that is lower than magnetic field gradient applied during the incubation step, wherein the container is rotated at a high speed that is higher than the rotation speed applied during the magnetic labelling step;

magnetic separation of the magnetically labelled cell fraction within the cell suspension as a consequence of a high magnetic field gradient that is higher than the magnetic field gradient applied during the incubation step and at a medium rotation speed that is lower than the fast rotation speed during the preceding resuspension step.

Each washing cycle produces a supernatant that can be collected and processed differently depending on positive or negative selection mode. In one aspect, different processing addresses the intensity in magnetic separation with respect to duration and field gradient and in another aspect the time point of discarding the said supernatant. In negative selection, the desired cells are contained within the supernatants for not being magnetically susceptible. Consequently, the sum of supernatants from incubation to washing form the new sample. Therefore, high intensity magnetic separation must be applied to the new sample as to separate between the desired and magnetically labelled undesired cell fraction. In case of positive selection, the present procedure always generates two distinct magnetic fractions containing the desired cells that are locally and temporally distinct, one during washing and one subsequent fraction during magnetic separation.

Also, the supernatants can be discarded or used for other downstream applications. Therein, the magnetic separation may be weaker and shorter, when compared to negative selection as to separate between very low or non-specifically labelled cells and sufficiently magnetized desired cells. When used in positive selection mode, both said magnetic fractions are required to be resuspended in a new fresh solution immediately after removing the supernatant and only after magnetic separation are merged to one new sample.

In a preferred embodiment, the washing procedure is carried out 1 to 5 times.

The magnetic separation step is used to finally divide ideally all magnetic from non-magnetic material. Preferably, the sample is not rotated during magnetic separation. In one preferred embodiment of the present procedure featuring negative selection, a strong magnetic field gradient is used during magnetic separation that is even higher than the magnetic field gradient during the particle addition step prior to incubation. This will allow effective fixation of the target cells and thus, removal from the suspension.

In one aspect of the disclosure relating to positive selection, the target cells represent the desired cells, whereas relating to negative selection, the desired cells are contained within the sample suspension.

Preferably, the method of the present disclosure uses particles containing magnetizable superparamagnetic material. The magnetic or magnetizable particle size (diameter or hydrodynamic diameter) ranges from 100 nm to 4 µm and particularly in range of 150 nm to 1 µm.

In one embodiment of the method of the present disclosure, the sample is incubated in a buffered solution prior to addition of magnetic or magnetizable particles that contains macromolecules for saturation of non-specific binding sites. Preferably, the cell concentration in a sample solution is adjusted within a range of $1 \times 10^3$ to $5 \times 10^5$ cells prior to application of the method of the disclosure.

The term non-specific binding (NSB) shall denote in the following undesired permanent or reversible association of biological material with various surfaces as present in the sample solution. The term reversible and irreversible NSB shall refer to binding between magnetic particles and cell surfaces. Wherein, "irreversible" shall denote the impossibility of binding partner dissociation without major destruction and excluding specifically developed dissociation procedures. In negative selection, irreversible NSB causes loss of desired cells due to undesired binding of desired cells with magnetic particles that in consequence are removed from the sample during magnetic separation or the washing step. The term reversible NSB shall mean that dissociation between magnetic particle and outer cell membrane is possible via cell-friendly washing steps. The method of the present disclosure minimizes reversible as well as irreversible NSB.

In a preferred embodiment of the method of the present disclosure, a pH-buffered solution during incubation in the following denoted as "blocking solution" is used. The blocking solution describes all substances to prevent NSB of cells with various surfaces present throughout the enrichment process. Such substances include, yet are not limited to globulare proteins, such as albumin, bovine, human albumin, serum albumin, ovoalbumin, lactoalbumin or plant albumin, beta lactoglobulin, kappa-kasein, histone, protamines, globulines, prolamine, glutenine or filamentous proteins, such as gelatin of all sorts, particularly fish and porcine derived gelatin, preferably adjusted to concentrations ranging from 0.1% to 5% weight per volume. Particularly, bovine serum albumin is suited as blocking reagent in concentration range from 2% to 5% and fish gelatin in concentration range from 0.5% to 5%.

The method of the present disclosure can be used in repetition then achieving higher enrichment rates of desired cells after each enrichment cycle. This approach is in particular useful for enrichment of peripheral blood circulating rare cells (CRCs). However, said approach may be likewise suited for positive selection, in demand of high capture efficiency. After each enrichment cycle, the desired cells are contained in a larger volume when compared to the volume required for particle incubation. No volume adjustment would result in ineffective magnetic labelling and consequently requires the reduction in volume for the next cycle, preferably by centrifugation.

The disclosure also relates to a device for labelling magnetic or magnetizable particles onto biological material that comprises at least one rotatable mount for, preferably commonly used, sample containers that allow concentric rotation at various speeds using a mount-coupled driving motor, a magnetic device that provides adjustable magnetic field strengths as well as field gradients at the location of the sample container and a controller to control driving motor and the magnetic device.

The magnetic device can be realized in various forms known to experts in the field. Included are electromagnets with given orientation and current that determine magnetic field strength and gradient. A more simple and cost-efficient device can be realized using one or several permanent magnets made for example from hard magnetic materials, such as neodymium, iron or hard ferrites from iron oxide as well as barium or strontium carbonate, PtCo-based alloy and many more.

A preferred embodiment, said sample container having an essentially cylindrical geometry and a longitudinal cylinder axis, said magnetic device consisting of a permanent magnet that generates a magnetic field having a magnetic field strength of equal distribution along the magnet's longitudinal axis and a magnetic field gradient in a direction perpendicular to the magnet's longitudinal axis. In one embodiment, the distance between the longitudinal axis of the magnet and the cylindrical axis of the mounted sample container is adjustable. In this embodiment, equal magnetic field conditions can be generated along the filling height of the sample container, wherein a magnet field is generated at levels perpendicular to the cylindrical axis of the sample container that imposes a magnetic moment to the magnetic or magnetizable particles that results in magnetophoric movement thus, separation of target cells.

In addition, in one embodiments of the device of the disclosure, the inclination of the longitudinal axis of the magnetic device (magnet) with reference to the cylindrical axis or shape of the mounted sample container is adjustable, especially during washing or magnetic separation. This facilitates maintaining equal distances between magnet and sample container across the longitudinal axis. This functionality allows distance adaption when facing varying geometries of the sample containers. For example, when using a sample container with cylindrical geometry and conical bottom (commonly used plastic sample containers in laboratories are designed with 11° angle of the container wall in the lower part of the vessel), the inclination of the magnet longitudinal axis in parallel to the conical angle allows adjustment of nearest distance between magnet and container across the entire incubation volume height and consequently, maximization of the magnetic effect. In general, the geometric adaption of the magnet improves the homogeneity of the magnetic field gradient in vertical axis relative to the incubation volume in the container and as such has positively affects magnetic interaction in all steps of the enrichment procedure.

Furthermore, the device of the disclosure comprises means for isolating desired cells from a sample of various biological materials, wherein the means for isolating include a mounted syringe that is functional and operated by programmable logic controllers and can interact with the sample container and magnet device, e.g. for the purpose of fluid transfer, mixing as well as drainage of sample fluid after magnetic separation. Mixing can be realized for example by repeated pipetting and dispensing. Moreover, the said device includes a syringe mounted needle as to allow fluid handling at the lower µl range with sizes in range of 19G to 26G and in lengths that correspond to the container height.

In a preferred embodiment, the mounted syringe can be tilted thereby, influencing magnetic separation efficiency in the device of the present disclosure by controlling drainage speed and related fluid drag of magnetic particles and magnetically labelled cells in dependence of inclination.

In a preferred embodiment, the sample container and the syringe are designed for handling fluid volumes in range of 1 µl to 100 ml.

The device of the present disclosure features modules for incubation and magnetic separation, respectively. The magnetic separation module consists of a pipetting device with one additional degree of freedom supporting the inclination of the syringe axis in the vertical plane. The term incubation module refers to as the functionality of purposed to associate magnetic particles with the target. The term pipetting device refers to as a mobile axis with three degrees of freedom holding a plastic syringe and facilitates the filling and drainage of fluids. The term magnetic separation module refers to as in particular the functionality of magnetic separation of in the prior process magnetized biological material.

In a preferred embodiment, the three parameters including the strength of magnetic field gradients, the rotation speed, and the duration of each step are adjustable in and depend on each process step and are summarized in the following Table 1:

TABLE 1

| Process step | Magnetic field gradient (arbitrary units: 0-10) | Rotation speed (rpm) e | Duration time (s) |
| --- | --- | --- | --- |
| Magnetic particle addition | 7-10 | 300-500 | 1-5 |
| Incubation-labelling | 4-6 | 2-10 | 10-30 |
| Incubation-mixing of cell suspension | 1-2 | 200-300 | 5-10 |
| Washing-mixing of separated magnetic fraction | 4-6 | 200-300 | 5-10 |
| Washing-separation of magnetic fraction | 7-10 | 2-10 | 10-15 |
| Magnetic separation | 10 | 0-2 | 30-180 |

In Table 1, specifications of the magnetic field gradient are relative and represent values in range of 0.5 to 100 Tesla per centimeter (T/cm), specifications of rotation speed and duration are given in absolute values in range of 0 to 500 rounds per minute (rpm) and in range of 0 to 180 seconds (s), respectively.

The strength of the magnetic field gradient as present in the sample container can be varied when using permanent magnets in the first instance via the distance between sample container and magnet. The smaller the distance, the higher is the gradient. A high gradient increases the kinetic energy of the magnetic particles.

The rotation speed of the sample container has effect on the efficiency of separating the magnetically labelled cell fraction as well as the contact time of magnetic particles with the biological material. The faster the rotation, the less efficient is the fractionation and the shorter is the contact time. Consequently, both aspects of the container rotation, the separation efficiency and the contact time require different consideration depending on each process step.

In summary, it shall be stated that the disclosure brings forth a serious of technical improvements that in particular enables enrichment of a minority of cells as for example applied in peripheral blood rare cell isolation. The disclosure features enrichment assays with almost complete capture of target cells. With respect to negative selection, resulting purities may equal or exceed those achieved by positive selection assays. The key improvement relates to reduction in non-specific binding potentially having solved the enrichment dilemma and resulting in low loss of desired cells, higher particle reactivity and faster reaction kinetics. The higher particle reactivity is ascribed to the increased availability of reactive particles over time when compared to common incubation methodology then being vastly engaged in the formation of non-specific binding. In parallel, increased availability of magnetic particles over time results in faster reaction kinetics when compared to incubation at rest (Waseem, Shahid, Rachanee Udomsangpetch, and Sebastian C. Bhakdi. "Buffer-Optimized High Gradient Magnetic Separation." Journal of Magnetics 21.1 (2016): 125-132), thus reducing the assay time to a few minutes. Moreover, the magnetic particles are a major contributor to the enrichment assay costs, thus the improvements relate also to cost reduction. Furthermore, the disclosure features assays handling small volumes therefore, supporting automation.

In general, the duration of the enrichment process starting from addition of magnetic particles to the sample suspension until the final enriched sample measures a few minutes, suggesting a new dimension of magnetic cell separation procedure. This assay speed may translate into higher sample throughput that may enhance scientific output as well as boost advancement in clinical routine. In particular, the short assay time facilitates enrichment repetition, which is crucial for high purity enrichment of minority fractions such as peripheral blood rare cells. Additionally, the given time frame of processing sustains viability of sample material. Moreover, the process supports control of labelling efficiency as facilitated by the enrichment device. Control is achieved by adjustment of the magnetic particle amount and/or the type and amount of the incubation cycles. This is relevant to address both modes of selection, negative and positive selection, respectively requiring constantly high magnetic labelling in case of negative selection and light labelling in case of positive selection.

The disclosure finds application in particular to enrichment of rare cells based on negative selection. It is suggestive that only very sensitive methods allow access to these cell types. The application thereof in particular for whole blood relates to the so called liquid or fluid biopsy. One aspect of liquid biopsy is the detection, characterization and/or cultivation of circulating tumor cells (CTCs). The principle of negative selection based on the disclosure facilitates non-biased or non-selective enrichment and is therefore, marker independent for example of the status and expression level of the standard CTC epithelial marker CD326. Furthermore, the disclosure supports diagnostic methods requiring high sensitivity and cultivation of CTCs of any phenotype. Taking together the principle of negative selection and the minor loss of information, the method of the present disclosure supports identification of so far unknown circulating cell types, herein comprehended as the circulating rare cell spectrum (CRC-spectrum). The ability of "cell-mining" is expected to advance diagnostic liquid biopsy as well as pharmacodynamic product development in the future. Moreover, the disclosure finds application in the non-invasive pre-natal testing (NIPT) in form of cell-based NIPT, wherein fetal cells in particular fetal erythroblasts and fetal trophoblasts can be isolated from the mother blood as to identify genetic aberrations by molecular analysis. Furthermore, the method of the present disclosure may find application in the prediction of myopathies based on the detection, quantification and characterization of certain rare cells such as circulating endothelial cells.

DETAILED DESCRIPTION OF THE DISCLOSURE

In the following, the disclosure will be described in more detail, making reference to preferred embodiments described with referenced to the attached drawings.

Figure 1:
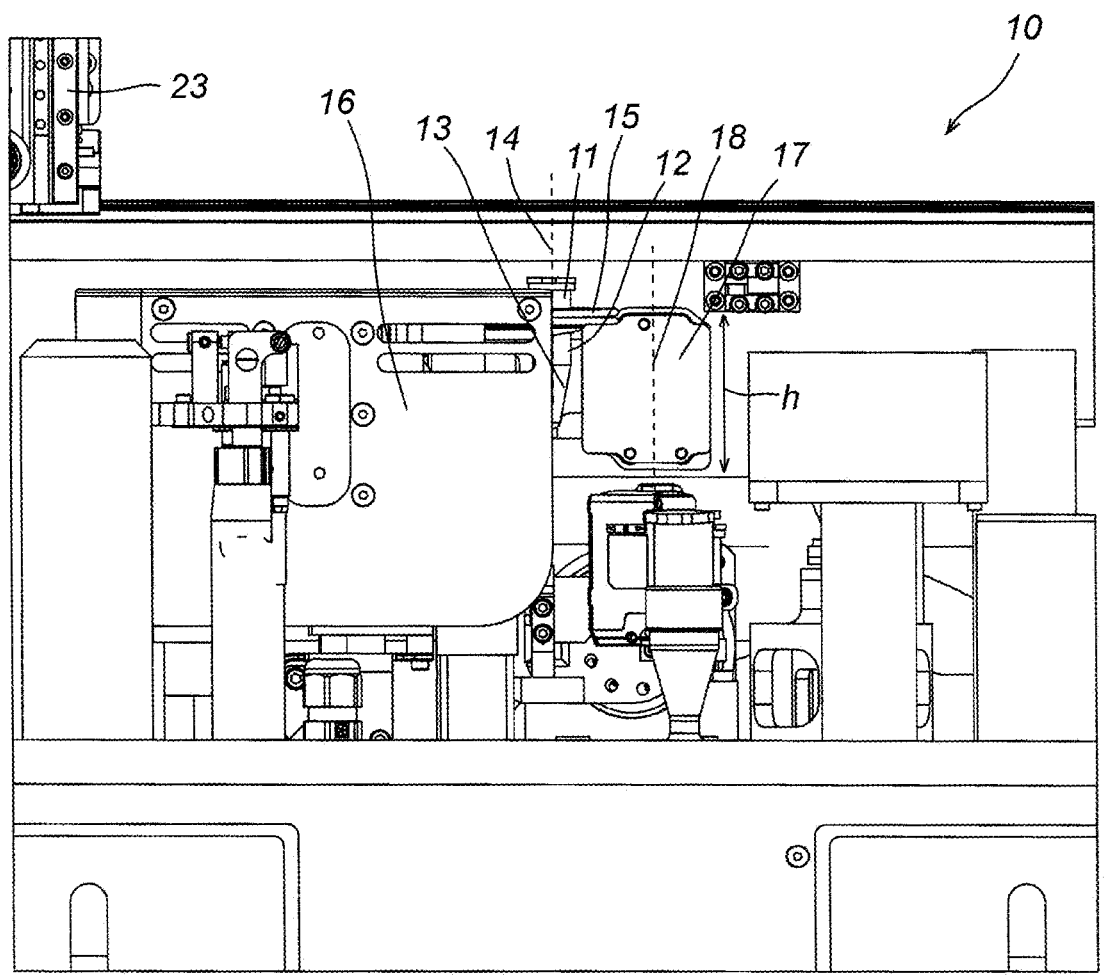
FIG. 1 shows a side view of the lower part of the device of the present disclosure purposed to conjugate magnetic or magnetizable particles to the biological material.

In FIG. 1, the lower part of the designated apparatus with the reference number 10 is seen and purposed for the conjugation of magnetic or magnetizable particles with biological material. A cylindrical sample container 11 is shown having a cylindrical sheathing 12 and a conical bottom 13. A longitudinal axis of the container 11 is characterized by the reference number 14. The sample container 11 is mounted in a rotatable holding that is connected with a gear drive 16. A permanent magnet 17 is shown in direct vicinity of the sample container 11 and its longitudinal axis is symbolized with the reference number 18.

Figure 2:
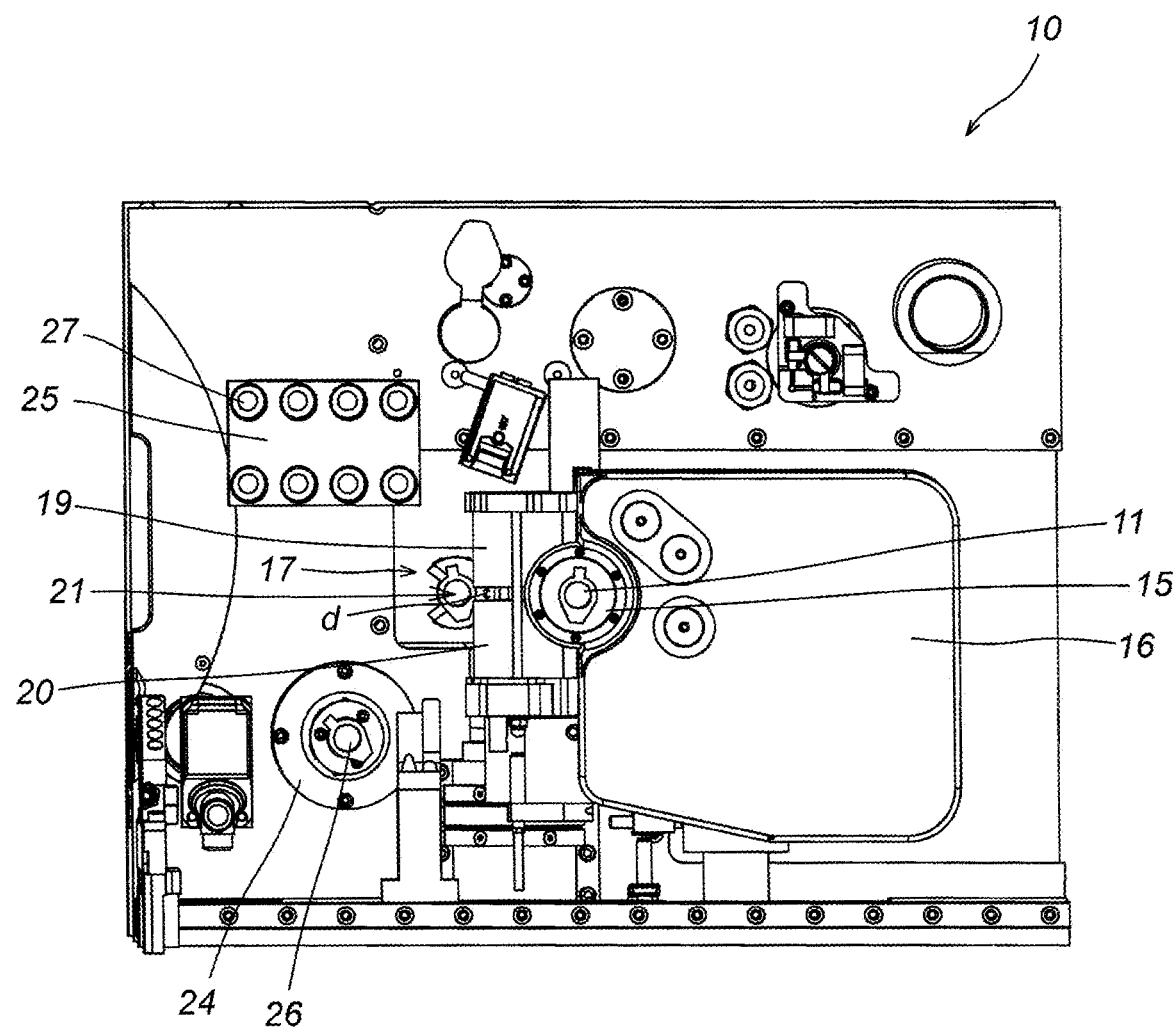
FIG. 2 shows a top view of the device mentioned in FIG. 1.

Particularly illustrated in the depiction of FIG. 2, two poles 19, and 20 of the permanent magnet are shown that are separated from each other by a gap 21 with distance d. The field strength of the permanent magnet and the gap distance d determines the field gradient that is present in the outer range of the gap. In this configuration, the magnetic field strength and as well as gradient is expected to be constant along the height of the permanent magnet 17 and also parallel to its longitudinal axis 18. Outside of the gap 21, a inhomogeneous magnetic field exists perpendicular to the longitudinal axis 18 of the permanent magnet 17. Consequently, at location of the sample container 11, the magnetic field is constant across the height of the sample container 11. In the depiction of the apparatus as shown in FIGS. 1 and 2, in direction perpendicular to the longitudinal axis 14 of the sample container 11, an inhomogeneous magnetic field exerts a magnet force on the magnetic or magnetizable particles in the sample container 11.

Figure 3:
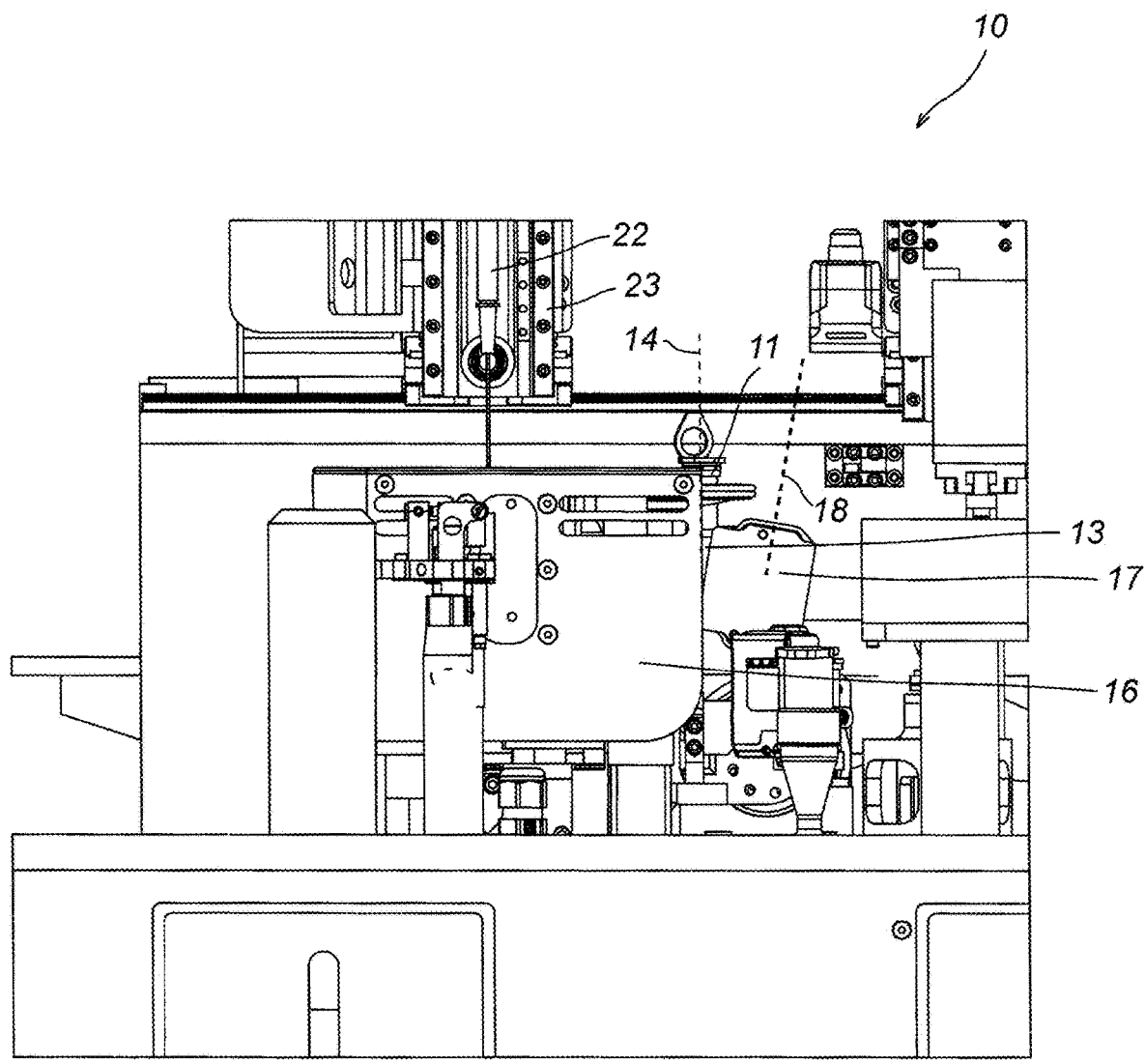
FIG. 3 shows a side view of the device mentioned in FIG. 1 in a different procedure stage, wherein the magnet is inclined.

Variation in distance between sample container 11 and permanent magnet, as well as the alteration in inclination of longitudinal axes 14, 18 of magnet and sample container, respectively and allows adjustment of magnetic field strength and gradient as present in the sample container 11. As can be seen from the illustration in FIG. 3, the position as well as inclination of the magnet 17 can be varied in reference to the sample container 11. In FIG. 3, the permanent magnet 17 is for example located in direct vicinity of the sample container 11 and inclined with respect to its longitudinal axis 14 of the sample container 11.

Figure 4:
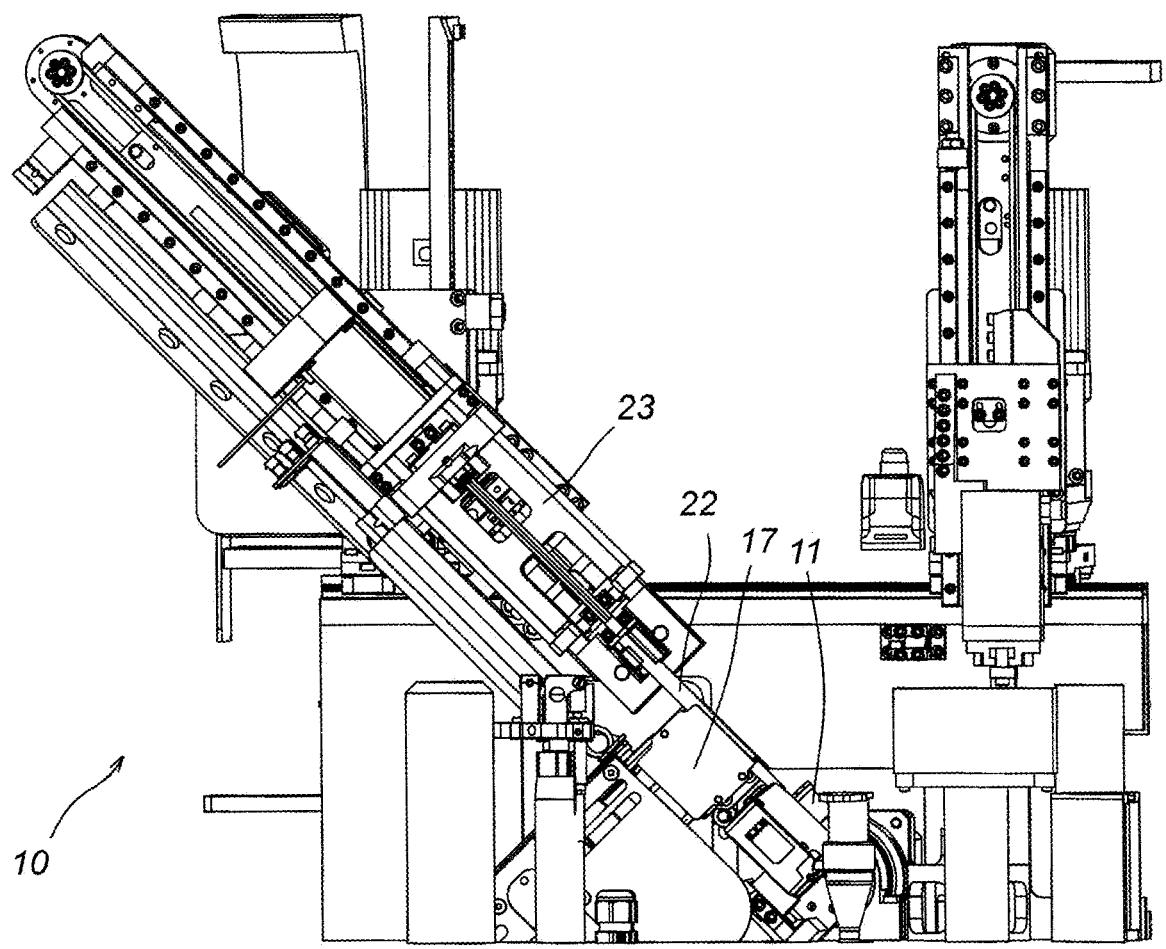
FIG. 4 is a view of the upper part of the device mentioned in FIG. 1, wherein the magnet is attached to the syringe.

The upper part of the device of the present disclosure is illustrated in FIG. 4, showing in particular a syringe 22 that is inclined and mounted in a holding 23 that allows movement in x, y, z direction, so that for example fluid can be pipetted from the sample container 11 into the syringe 22 and vice versa. Moreover, the holding 24, 25 is shown in FIGS. 1 and 2 with an additional sample container 26 or otherwise fluid container 27, which likewise can be accessed by the syringe.

Figure 5:
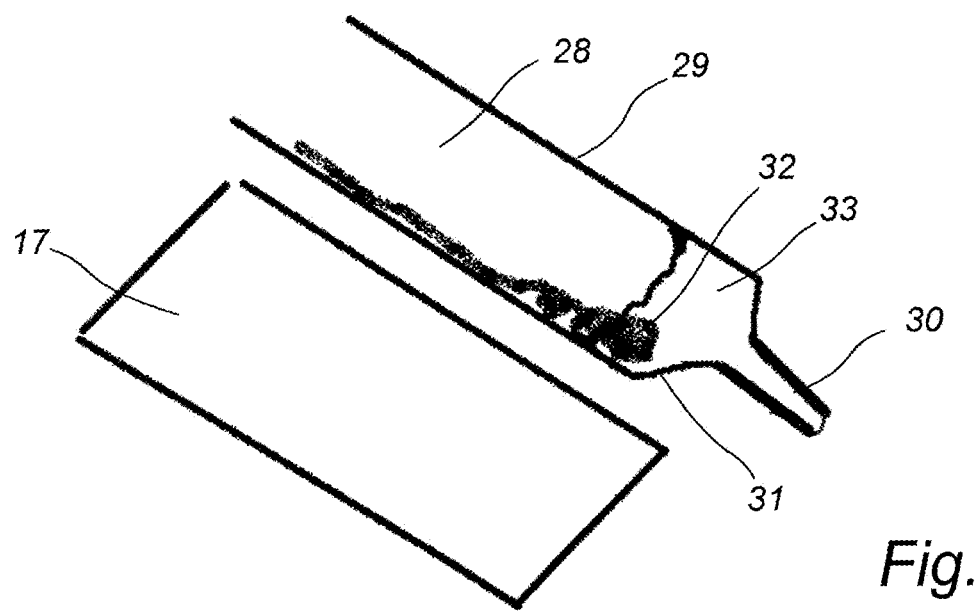
FIG. 5 shows a schematic drawing of a cross section of the in FIG. 4 used syringe.

FIG. 5 illustrates a preferred embodiment of the syringe 22 that exhibits a main body 28 with general cylindrical sheathing 29 that ends in an outlet 30 that is characterized by a smaller diameter. In a round bodied passage area 31 between main body 28 and outlet 30, the magnetically separated cell fraction 32 consists of magnetized target cells and unbound magnetic particles and is allowed to accumulate whereas the supernatant 33 can flow out through the outlet 30.

The device of the present disclosure is operated by a programmable logic controller and duly programmed supporting fully automation of the method of the present disclosure in one or several repeats.

Deeper insights and understanding about magnetic labelling have been obtained by observations in experimentation about magnetic labelling of biological materials. Therein, an association between reaction kinetics and specific as well as non-specific binding has been noticed. In detail, the observation was that specific binding was favored when increasing reaction kinetics during the incubation process as achieved by means of a beneficial control of the movement of the magnetic particles.

In general, an advantage in binding is expected for the specific binding of antibodies to ligands when compared with non-specific binding. Commonly, the affinity of antibodies to bind antigens is significantly higher when compared to non-specific binding. Often the capacity of antibodies to bind antigens is given as inverse of the dissociation constant and measures in case of antibody-antigen binding in range of $10^{-7}$ to $10^{-9}$ and may measure in rare cases up to $10^{-12}$. In general, the dissociation constants of non-specific binding do not exceed the micromolar range ($10^{-4}$-$10^{-6}$) and the binding behavior is often linear (Hein P., Michel M. C., Leineweber K., Wieland T., Wettschureck N., Offermanns S. (2005) Receptor and Binding Studies. In: Dhein S., Mohr F. W., Delmar M. (eds) Practical Methods in Cardiovascular Research. Springer, Berlin, Heidelberg).

In contrast to the antibody-antigen or similar key-lock bindings, such as DNA probes, non-specific binding does not elicit fast key-lock pairing often being characterized by an undefined binding constant. Consequently, the binding can be understood as an association with a range in stickiness up to the point of irreversibility. Moreover, it is assumed that the quantity of possible binding sites for specific binding pairs is comparatively higher. Furthermore, it is assumed that kinetic energies of different particles as influenced by different magnetic field strength has effect on the formation of specific as well as non-specific binding.

The knowledge and assumption in combination about the binding behavior of magnetic particles to biological material for specific or non-specific binding, respectively, has led to a new theory to prevent non-specific binding. In more detail, the key to non-specific binding prevention is to be in control of certain parameters during incubation that are based on the collision theory. Well accepted is the fact that particle concentration and particle specificity, respectively are associated with reaction kinetics. This association can be better explained by physical characteristics. One may assume that magnetic particles in solution at room temperature are subject to random or passive movement depending on particle size in the absence of a magnetic field.

The movement of very small particles in diameter ranging from 30 nm to 250 nm will be largely determined by Brownian molecular movement. The movement of larger particles with diameters up to 4 μm is mainly determined by gravitational force, which then leads to sedimentation of the particles when kept at rest. Furthermore, it is assumed that random movement of very small particles exhibits a greater frequency of collisions per given time period when compared to larger particles and volume expansion of a few times the dimensions of the particles (local collision frequency). This potential of high local collision frequency translates into faster binding per time if a ligand is present. High collision frequency is of advantage for the establishment of localized binding given the assumption of higher chances of specific over non-specific binding. This passive particle movement has been exploited commonly in magnetic labelling methodology, yet can be influenced by means of a suited magnetic field. Under influence of a magnetic field gradient, the random movement of small particles is minimized and the gravitational force on large particles is superseded. This in its principle magnetic field assisted magnetic labelling imposes a certain magnetic drag force on the particles directed towards the highest magnetic field gradient. The strength of the magnetic drag force is determined by the magnetic susceptibility of the magnetic particles on the one hand and the height of the magnetic field gradient on the other.

The magnetic drag force translates into a certain average speed of the particles directed towards the field gradient maximum depending the viscosity of the medium as well as non-magnetic obstacles within the medium. In this situation, magnetic particles assume a certain linear moment in the presence of the magnetic field gradient baring the potential of collision with comparatively immobile ligands in a volume that may ultimately stretch across the container's cross-section in dependence of incubation time.

It is furthermore assumed that collision events between magnetic particles and biological material, particularly cell membrane surfaces are associated with a certain degree of stickiness and therefore, can be differentiated between two time points, one is the impact and the other is the dissociation, excluding the event of permanent specific binding. The time between impact and dissociation shall be referred to as contact duration. Longer contact duration may be favorable for generation of non-specific binding and therefore, shall be minimized or shortened in the magnetic field assisted magnetic labelling process. In case of targeting cells, highly unfavorable is the effect of membrane penetration by magnetic particles as a result of long lasting and too high impact of particles on the cell membrane. Membrane penetration shall be avoided in magnetic cell separation, yet has been exploited in gene transfection assays (FOURIKI, A. [u.a.]: Evaluation of the magnetic field requirements for nanomagnetic gene transfection. Nano Rev. (2010) 1, 1-5).

The negative effect of membrane penetration is obvious, as cell loss of targeted cells can be expected. In positive selection, the effect means a loss of desired cells, in negative selection, intracellular components of destroyed cells may release proteolytic material which in turn may negatively affect the integrity of desired cells. Therefore, soft magnetic drag force of the magnetic particles impacting the cell membrane is preferred. Moreover, of note is the collision frequency of particles with one cell per given time period. High frequency may be of advantage for the formation of local binding assuming a greater likelihood of specific binding against non-specific binding. In the system of magnetically influenced particle conjugation, the localized collision frequency is minimal, whereas the global collision frequency as understood as the collision of one particle with several targets within given time and volume, is increased. Similarly to local collision frequency, increased global collision frequency is beneficial for the formation of binding. However, an advantage over local collision is reasoned that in general biological and physical differences in the system, such as for example receptor density, cell size or charge are limiting factors of reaction kinetics potentially causing asymmetrically distributed labelling across target cells, which can be overcome in the magnetically assisted labelling process (the term "particle reactivity" shall be understood in the following as the capture efficiency of target cells by means of a suited magnetic separation device. The capture efficiency is related to a defined amount of particles that is able to separate a certain amount of cells and given in the amount of separated cells per µl particles suspension).

Characteristic for the collision behavior in magnetically assisted labelling is a marked difference in speed between magnetic particles and biological material. The device of the present disclosures in particular designed for magnetic incubation allow control of the speed difference by controlling the position of magnetic particles relative to the magnetic field gradient and relates to; the magnet to container distance, the container rotation speed, and the type of magnetic arrangement. The optimal configurations of the device for efficient magnetic labelling is determined by the magnetic susceptibility or size of the magnetic particles.

In view of the previously described theoretical assumptions about influencing system parameters, the underlying processes in different magnetic particle systems shall be explained.

The incubation of cells with magnetic particles in the absence of a magnetic field is current state of art as practiced in the market. Miltenyi AG uses the smallest particles of its kind ranging in diameter from 50 nm to 100 nm and thereby suggest incubation at rest under cooled conditions for 10 min to 30 minutes. The small particles form stable colloid in the environment of cell friendly buffered solutions and exhibit a comparatively large virtual surface area. The particle movement during incubation is determined by Brownian molecular movement. It can be expected that these small particles generate a very high local collision frequency and low contact duration, which is beneficial for specific binding according to our theory. However, as to achieve efficiency in magnetic labelling and reaction speed, a high particle concentration is required as to compensate the particles' relatively limited spatial expansion. Larger magnetic particles purposed for magnetic cell separation are manufactured by Dynal with a hydrodynamic diameter in range of 1 µm to 4 µm. In contrast to small magnetic particle systems, large particle systems do not require complex magnetic separation devices however, may present an overall lower efficiency in magnetic labelling. The larger particles exhibit less Brownian molecular movement and are subject to sedimentation, hence the necessity of mixed incubation. In using larger particles, it is assumed that global collision as well as contact duration is increased, respectively. A longer contact duration is assumed to favor non-specific binding. Also, the pairing of one or a few large magnetic particle or particles, respectively to non-target cells results in magnetically susceptible cells. However, this problem is mitigated using a small amount of particles orientated to the number of targets in small ratios. Still, a relative high particle concentration is required to raise the likelihood of collision to a practical level. Fachin et al. reports the use of dynabeads reactive against CD45, CD16, and CD66b incubated in whole blood samples that ranged in volumes from 5 to 10 ml purposed to negatively enrich circulating rare cells (CRCs) by means of an integrated micro-fluidic chip device (Fachin et al. 2017). Therein, the red blood cells are removed by the so called deterministic lateral displacement module and the white blood cells are separated by a magnetic separation module. In the experiments, at least 5 ml whole blood has been used containing on average $3 \times 10^7$ undesired nucleated target cells. The minimal required amount of cell-bound magnetic particles was assumed to measure 6 particles. When using $3 \times 10^7$ cells, an amount of $1.8 \times 10^8$ particles are at least required to achieve 100% magnetic separation and corresponds to an amount of 180 µg or 18 µl dynabead suspension for 5 ml whole blood (the concentration of dynabeads was provided measuring in range of 7 to $12 \times 10^9$ per ml per 10 mg, assuming $1 \times 10^{10}$ particles for this calculation).

In the experiments, the used amount of particles was reported to measure 1.2 mg dynabeads per ml blood and results in a labelling efficiency of 3%. Therefore, this magnetic system is associated with relative high costs upon sampling greater blood volumes. Improvement with respect to incubation duration and efficiency in magnetic labelling has been noted by incubating in the presence of a permanent magnetic field gradient and concentric container rotation (Schreier et al. 2017). The procedure was referred to as dynamic magnetic labelling (DML) and can be explained using the above mentioned theory. A different collision behavior can be expected for particles in range of 100 nm or larger when compared to incubation at rest. Therein, the influence of Brownian molecular movement is assumed to be dramatically reduced in favor of magnetic drag towards the highest gradient. Therefore, random movement and local collision frequency are reduced in favor of global collision frequency and contact duration.

In particular, a high global collision frequency results in high labelling efficiency however, higher contact duration favors the formation of non-specific binding. A study purposed to evaluate negative selection in magnetic cell separation using magnetic particles in diameter of 100 nm showed that 3 log depletion of nucleated in particular CD45 positive cells is possible within 35 min. However, the described procedure was focused more on the maximization of magnetic labelling rather than the minimization of non-specific binding. The calculated particle efficiency measured $3 \times 10^5$ cells per µl particle suspension (the particle concentration measures approx. $1.4 \times 10^9$ particles per µl). A threshold quantity of 1000 cell bound particles is assumed to be sufficient for being magnetically susceptible using the described magnetic arrangement. IN this system a particle efficiency of 21.4% can be calculated. However, as already mentioned and expected, considerable losses of desired cells have been encountered in particular when aiming at higher particle reactivity.

In further leading investigations and the obligation to understand the DML-process, significant improvements could have been made using respective devices that are relevant in the present disclosure. Of importance for the present disclosure is the insight that non-specific binding can be prevented by optimal influence of a magnetic field throughout the isolation method of the present disclosure. This improved enrichment process can be carried out with a suitable device as defined in the present claims. Thus, the disclosure offers a workable solution to the enrichment dilemma and aims to maintain high magnetic labelling efficiency whilst minimizing the formation of non-specific binding. Following the theoretical elaborations, the increase in global collision frequency and reduction in conduct duration during incubation cycles is center point of optimization to increase reaction kinetics of specific magnetic labelling.

As already stated, the theory assumes and experiments have shown (Schreier et al. 2017) that high global collision increases the probability of binding within given time frame. Yet, in the present disclosure, the awareness heightened to actively reduce the probability of non-specific binding by means of type and application of magnetic fields throughout the magnetic cell separation procedure. It is presumed that the specific parameter of contact duration plays important role being directly associated with non-specific binding and is determined by push and pull force of the particles onto the biological material.

In the following, essential characteristics of the disclosure are detailed that have led to improvements when compared to current state of the art, providing solutions for the enrichment dilemma, facilitating technical automation, and reducing expense in time and costs. Based in the assumption of differences in the binding behavior between irreversible non-specific and specific binding in dependence of collision behavior, an incubation device has been developed that incorporates state of the art methodology in particular the principle of dynamic magnetic labelling combined with new insights as presented in this disclosure. The overall new knowledge has been used to gain influence on the collision behavior resulting in high magnetic labelling efficiency and the minimization of non-specific binding.

A suitable device for carrying out the process of the present disclosure is shown in FIGS. 1 to 5. The disclosure resulted in a device providing modifiable magnetic fields with respect to adaption to varying incubation volumes as well as incubation container geometries. Moreover, the idea of static container rotation in current state of the art methodology has been adopted, yet was investigated and implemented as new functionality for the purpose of controlling non-specific binding (c.f. Example 3 below).

The magnet and its way of application are of fundamental importance in the incubation device. The type, arrangement and dimensions of the magnet and magnets, respectively have effect on the labelling efficiency and formation of non-specific binding. Thereby, the magnetic device must aim to affect at best all magnetic particles in the system, in an optimal manner. Optimal influence relates to the magnetophoric behavior of the magnetic particles and may require a high and comparatively uniformly distributed field gradient in the vertical axis.

This is in particular of advantage for an equal distribution of particle labelling across target cells at different locations in the incubation volume. Consequently, there are two main characteristics of the influencing magnetic field; the strength of the magnetic field gradient to sufficiently influence small magnetic particles in dependence of their magnetic susceptibility and the spatial extension of the magnetic field strength, affecting the magnetic particles at best evenly throughout the incubation volume. One can assume that efficient enrichment is supported by application of high magnetic field gradients as well as field strength.

Thus, the arrangement and dimensions of the magnet shall be determined by the dimensions of the incubation container and more specifically, by the incubation volume and the magnetic susceptibility of magnetic particles. Variation of incubation volumes and particle diameter are supported by adjustments of the magnetic device and relate to container-to-magnet distance, container position in relation to the magnet and magnet dimensions. Thus, the height of the magnet (longitudinal direction) is determined by the height of the incubation volume in the container and requires an increase in dimensions by 3 to 6 times the height of the incubation volume. The aim of the magnet arrangement is to achieve full magnetic field saturation within range of the incubation volume. It is further assumed that the magnet breadth (y-direction) affects the magnetic field strength as present at a certain distance to the magnet surface. Thus, the magnet dimensions are determined by the diameter of the incubation volume and of the incubation container, respectively.

Moreover, the incubation device of the present disclosure allows variation of the magnet position in reference to the incubation contain, which is fundamental for the disclosure and thus, improved magnetic incubation as well as washing. Thereby, the functionality of magnet position variation supports the generation of optimal magnetic conditions in the system required to increase binding in favor for specific binding. In one embodiment, the position variation is realized by motorized movement of the magnet in vertical and horizontal direction. The maneuverability in vertical direction provides optimal magnetic field conditions upon changing incubation volumes during the assay run and between single assay steps that include particle addition, incubation, washing and magnetic separation. The container position can be understood in relation to the magnet and is positioned at the center of the magnet face where equal distribution of the magnet field gradients in z-direction can be assumed. It is then assumed that magnetic field conditions are optimal for magnetic incubation in the center of the vertical as well as horizontal plain of the magnet.

The motorized movement of the magnet in horizontal direction controls the distance between incubation container and the magnet. In general, it is intended that the kinetic energy as well as the particles' linear momentum can be influenced by the device of the present disclosure. In realization, a small container-to-magnet distance results in magnetic particles with high kinetic energy as well as a high momentum and is assumed to be unfavorable for the pairing of magnetic particles with biological material. Based on this insight, an optimal magnetic field situation can be established by the magnetic device supporting pairing during incubation that is in favor of specific binding. A further technological optimization is represented by the functionality of magnet inclination in the vertical axis that allows adaption of the magnetic field to the container geometry when using conical shaped containers (see FIG. 3).

Furthermore, the incubation device of the present disclosure includes the functionality of container rotation. The range of rotation speed is determined largely by the magnetic susceptibility of the magnetic particles and affects the reactions kinetics and direction of movement of the particles relative to the non-magnetic material and consequently influences magnetic labelling efficiency. In detail, it is assumed that the rotation speed influences the magnetophoric capacity of particles during the incubation process of magnetic labelling. So for example, in case of non-rotated incubation, a high proportion of unbound or cell-bound magnetic particles are separated in the presence of a high magnetic field gradient within seconds and lost for specific pairing. It is wishful and achieved by the incubation device to maintain high particle kinetics and momentum whilst preventing magnetic fractionation. Incubation medium viscosity and density of biological material determine the separation time and negatively correlate with magnetophoric behavior of the magnetic particles. Similarly, rotation negatively correlates with magnetic particle velocity, so that delayed, decreased or no magnetic fractionation at all can be observed depending on the speed of rotation. The association between rotation speed and time of magnetic fractionation can be explained firstly by the encounter of moving disturbances relative and perpendicular to the particle travel in a cell suspension. The degree in disturbances correlates with the content of debris and/or cell concentration. Furthermore, the particles experience a certain shear force attributed to the viscosity of the cell medium in rotation. As already theorized, the purpose of rotation is to control of the magnetophoric behavior of the magnetic particles in a permanently high magnetic field potentially enabling control over the particle collision behavior hence, control over magnetic labelling. Hereby, the contact duration of magnetic particles with biological material is of great importance. In view of the rotation, the magnetic particles may assume a direct path to the magnet surface until blocked by the container wall irrespective of container rotation. However, the biological material is circulating at speed of the container rotation suggesting both the magnetic particles and the biological material in motion at directions of movement perpendicular to each other. Consequently, the higher the speed difference between the reaction partners the lower will be the chance of binding. It is concluded that rotation in particular at higher rotation favors specific binding when compared to irreversible non-specific binding that commonly requires longer contact duration when compared to specific receptor ligand interactions.

Following the theoretical explanations of the magnetically influenced incubation process, the method of the present disclosure applies different rotation speeds during each step throughout the magnetic separation process that includes the step of magnetic particle addition, the magnetic incubation, the washing procedure, and finally the magnetic separation.

The general idea of how to maintain high magnetic labelling efficiency is to keep the magnetic particles in solution under movement as long as possible. In any other case, particles are separated and lost for the interaction with biological material. Nevertheless, the incubation process as invented shows fractionation in the presence of high concentrations of target material already after a few seconds. Seemingly, the rotation is not completely efficient in preventing separation during magnetic labelling/incubation. In order to restore a situation of equal distribution of all constituents in the reaction suspension, a mixing step must follow. Most suited mixing can be achieved by vortexing or repeated pipetting and dispensing. In one embodiment, the mixing is done by automated conduct of a plastic syringe and needle in form of repeated pipetting and dispensing of the sample solution. Using the syringe was shown to be more efficient when compared to vortexing. Then, the magnetic incubation together with subsequent mixing is referred to as one incubation cycle.

For similar assays in the field, it is commonly considered beneficial to optimize amounts of magnet particles used per sample as to reduce non-specific binding as well as reduce costs. Most challenging in the consideration is the level of capture efficiency and the number of target cells, respectively. Previously, one could observe a reduction in reaction kinetics (thus, a reduction in particle efficiency) upon increasing target cell concentrations (Waseem, Shahid, Rachanee Udomsangpetch, and Sebastian C. Bhakdi. "Buffer-Optimized High Gradient Magnetic Separation." Journal of Magnetics 21.1 (2016): 125-132). This means that fewer particles bind per target cell over the course of similar incubation times. The reduction seems to be approximately linear. In the present disclosure, the binding behavior is contrary to previous observations given that target cells comprise the majority in the sample suspension. Herein, higher target concentrations result in an increase in reaction kinetics and allowing a further reduction in bead amount. Consequently, both optimization objectives, namely the reduction in costs and non-specific binding are accomplished and potentially contributing to the solution of the enrichment dilemma.

The positive correlation between target cell concentration and labeling efficiency can be explained by the higher global collision per incubation cycle. Therefore, the incubation volume is a key parameter in the optimization of minimal required bead amounts and determined by the target cell concentration.

It was shown that a threefold increase in particle reactivity could be achieved upon threefold reduction of the incubation volume, thus increase in target cell concentration. More importantly, a reduction in non-specific binding can be achieved and is explained by the increase in particle reactivity which translates into the necessity of lesser particle amount and increased chance of specific binding. Therefore, the incubation volume is a key parameter in the optimization of the minimal necessary magnetic particle amount. The insight is of importance for applications requiring highest possible enrichment efficiency with the obligation of complete or at least high recovery of desired cells, such as the isolation of rare cells via negative selection from whole blood. Therefore, the aspect of target depending incubation volumes is one aspect of the disclosure to solve the problem of high depletion of undesired cells and minimal loss of desired cell (Example 4).

The enrichment process of the disclosure includes insights of the dynamic magnetic labelling method and is divided into explicit process steps comprising the magnetic incubation, the washing and magnetic separation. The following shall explain that the functionality of the present apparatus is key in reference and with regard to the interplay of incubation and separation device in solving the enrichment dilemma. All sub processes are handled within and via the device of the present disclosures. The magnetic incubation consists of repeated incubation cycles which, themselves are divided into magnetic incubation by rotation and a mixing step. In these steps, the aim is to maximize specific binding per incubation cycle. However, high binding kinetics often come with increased reversible non-specific binding and requires the washing of the magnetic particle fraction. Therefore, the washing is essential part of the disclosure, and is distinct from state of art washing methods. Herein, washing is done similar to magnetic incubation being separated into incubation and mixing. Prior to the addition of washing solution, a complete separation between the magnetic and non-magnetic material is required. The magnetic fraction is then resuspended in the presence of strong magnetic field similar to the magnetic incubation after adding washing solution. The magnetic device set up shall prevent binding of any sort, and moreover reverse non-specific binding. Incubation and washing steps are followed by the magnetic separation relying on the magnetic separation device. Thereby, the sample suspension as contained in a suitable vessel will be brought into the highest influence of the magnetic field gradient and rested for a few minutes, preferably in range of 0.5 to 3 minutes. The key advantage of the present enrichment process is the high recovery of desired cell material and thus, supporting both modes of cell separation, positive and negative selection with respect to the prevention of cell loss and yield of high purities of desired cells.

In detail, the method of the present disclosure begins with the adjustment of the target cell concentration, preferably by centrifugation and resuspension of the cells in a certain volume. As mentioned earlier, the volume adaption is purposed to increase reaction kinetics. During the volume adjustment step, a receptor blocking step may be applied by supplementing the cell suspension with commonly used blocking reagents for a short period of time in range of a few minutes prior to centrifugation. Blocking shall be applied in samples with high background noise or other particle content, respectively. Once the sample has been adjusted to the right volume, magnetic particles can be added in the presence of a magnetic field. Starting from the particle addition the apparatus settings comply with the different requirements in magnetic particle collision behavior. The settings are also listed in table 1 for individual process steps with respect to magnetic strength as well as container rotation. During the step of particle addition, the device of the present disclosure is set to achieve highest possible particle mixture in the cell suspension whilst preventing any sort of binding and magnetic particle fractionation. Thereby, a high magnetic field strength as well as high speed container rotation is applied during a short time period of a few seconds. The particle addition is followed by the magnetic incubation in form of incubation cycle as described earlier. In contrast to the particle addition, maximization of in particular specific particle binding is envisioned during incubation and thus, allows magnetic fractionation over a longer time period in the presence of a weaker magnetic field gradient when compared to the particle addition step. However, one incubation cycle shall not last longer than the required time for completing magnetic separation of the magnetic material. The maximization of specific magnetic labelling is realized by increasing the global collision frequency as such the collision of one particle with as much target cells as possible. Therefore, the magnetic field and the container rotation is reduced when compared to the particle addition step, resulting in lowered magnetic drag force and increased contact duration thus, supporting binding. Of note is that the most favorable magnetic field situation during magnetic incubation or labelling is realized in the present device by variation of the distance between magnet and sample container. Typically, this distancing requires calibration. In short, the right distance during an incubation cycle shall not cause fractionation of highly magnetically susceptible particles within a few seconds. As we understand, the magnet to container distance and rotation speed are key parameters to influence magnetic labelling efficiency. So for example, in positive selection a minimal labelling quantity per target cells is required in particular when handling live cells that shall become magnetically separable, yet without the particles negatively influencing the cells. In negative selection, a maximal labelling quantity per cell is favored to assure complete magnetic fractionation. In both cases equal distribution of magnetic particles across cells is favored. The device of the disclosure enables compliance with these different magnetic labelling goals. In case of positive selection, magnetic particles may not require to saturate all binding possibilities. In this case, a higher rotation speed with smaller magnet distance are favorable when compared to negative selection.

The incubation step is followed by a washing step which aims at the reversion of non-specific binding whilst preventing any kind of binding. The washing is associated with magnetic cell fraction that resulted after magnetic labelling and consists of mostly magnetic particle bound target cells, yet also any other biological material including desired cells. The washing is carried out in a similar fashion as the incubation cycle consisting of a mixing and a rotation step. During mixing, the apparatus settings are once again changed assuming highest rotation speed of the container and furthest magnet distance thereby reducing the influence of the magnet on the particles. Shortly after mixing, the rotated incubation follows, hereby adjusting the magnet to container distance to zero and setting the container to low rotation speed.

One incubation cycle does not achieve substantial degrees of magnet labelling, thus high capture efficiency. As to increase the magnetic load onto the target cells, the incubation cycle may be repeated several times. As mentioned earlier, the method of the present disclosure relies on forced collision between magnetic particles and non-magnetic biological material thus, increasing magnetic load, yet also higher non-specific binding when compared to incubation at rest. However, the herein encountered non-specific binding is mostly reversible, which is realized by subsequent washing. After the last incubation cycle, non-magnetic desired cells may be contained in the supernatants and magnetic desired cells may be contained in the magnetic particle/cell fraction. The supernatant containing the non-magnetic desired cells should be transferred and kept in a separate container of similar type and volume. A washing solution is added to the magnetic particle/cell fraction adjusting the volume similarly but not more than the previous used incubation volume and is followed by subsequently thoroughly mixing. In the presence of a magnetic field gradient, the washing suspension is magnetically separated not longer than done during one incubation cycle. In a preferred embodiment, the magnetic field gradient shall be highest as to increase magnetic particle velocity and consequently prevent binding and/or reverse non-specific binding. Thereby, the apparatus is set to increase container rotation as well as minimize the distance between container and magnet. The ability to incline the magnet to adapt to the container geometry complies with the requirement of a high magnetic field gradient throughout the sample volume. One washing cycle has ended, when the new supernatant containing washed out biological material and non-magnetic desired cells have been added to the first supernatant kept aside in an additional container as described earlier. Consequently, the washing procedure causes a sample volume increase in negative selection mode depending on the number of washing cycles. Three washing cycles may suffice complete reversal of non-specific binding. Subsequent to washing, magnetic separation is carried out at rest. In view of costs and space optimization, respectively, the magnetic separation device uses the same magnet as used during incubation and washing. In one preferred embodiment, the magnetic separation is carried out by attaching the plastic syringe containing the sample solution to the magnet wall. Herein, the highest possible magnetic force must apply. Also at this step, the capture efficiency can be controlled by duration. The shorter the separation duration, the more low magnetically susceptible cells remain in solution. Very lengthy and thorough magnetic separation may not exceed 5 min in the present disclosure and bares the possibility of separating desired cells that have magnetized by irreversible non-specific binding. The enrichment can be completed within a few minutes under optimal situations and achieves up to 2 log levels.

In one embodiment of the magnetic separation step, the non-magnetic sample solution may contain desired cells and is transferred into a new dedicated sample container after completed magnetic fractionation. The sample solution transfer is ideally done by simply draining the plastic syringe without change in location of pipette device and container. This pre-supposes that the magnetic separation takes place in the syringe body and the syringe is placed adjacent to the magnet. Apart from simplicity, magnetic separation within the plastic syringe of the pipetting device turns out favorable with respect to the column-like geometry offering equal magnetic field conditions in height throughout the sample volume suggesting improved capture efficiency. In one further embodiment, the pipetting device containing the plastic syringe exhibits additional functionality as to further increase magnetic capture of in particular low magnetically susceptible target cells (the term capture efficiency is given in log levels and describes the ratio between target cells before and after enrichment; The capture efficiency is influenced by several system parameters that may include cell biology with respect to receptor density, ligand accessibility or frequency, the amount of cell transfers or the efficiency of the magnetic separation apparatus). The functionality includes the bending of the pipetting device in its vertical axis in parallel with the magnet in a reasonable range up to 50 degree inclination (FIG. 4). A synchronized inclination between syringe and magnet is required. Thereby, sensible is to arrange the syringe laying on top of the magnet during inclined positioning. Experiments have revealed that low magnetically susceptible target cells can be separated prior to draining and transfer of the sample solution (non-magnetic fraction), yet re-entered solution upon drainage of the supernatant from the plastic syringe. In more detail, the low magnetic susceptible target cell fraction is dragged along the liquid-air interface upon drainage of the plastic syringe and consequently lost (FIG. 5). The functionality of bending the pipetting device can take place before or after completion of magnetic fractionation. The bending takes place at latest during draining of the plastic syringe. Increase in capture efficiency upon execution of the bending functionality can be explained by the additional grip of magnetized target cells to the plastic wall during drainage. Moreover, a bulge is required at the lower rim of the container (here the syringe) potentially blocking a loose magnetic cell fraction from exiting the container upon drainage (FIG. 5).

It can be seen that the enrichment method of the disclosure supports the control magnet labelling with respect to distribution and the amount of magnetic particles bound per cell. Key parameters to control magnetic labelling include the repetition number of incubation cycle, and within an incubation cycle the kinetic energy of particles, thus the container rotation speed and the magnet to container distance. Cell magnetization shall be kept at a necessary minimum in awareness of costs, the formation of non-specific binding, assay duration and cell stress. The minimum is largely determined by the magnetophoric threshold where cells above the threshold are magnetically separable by the magnetic separation device. Given the fact of non-equal particle distribution across target cells, the necessary minimum may be different between positive and negative selection. The latter enrichment strategy may require significant higher magnetic loading as to achieve new complete fractionation. Therefore, fast reaction kinetics are required, yet being obliged to reduce magnetic particle amount. In a preferred embodiment, a low rotation speed with greater container to magnet distance supports fast reaction kinetics. In a further embodiment, the incubation duration is reduced whilst increasing the incubation cycle repetitions. With regard to positive selection in particular of rare target cells, an overly high amount of particles are in the system when compared with the number of available binding sites, so that the incubation mode must be adjusted to generate low binding kinetics as to avoid magnetic overloading of cells.

One preferred embodiment complies with the requirements of positive selection by decreasing the container to magnet distance whilst increasing the container rotation speed and decreasing the incubation cycle repetitions.

In the following, the disclosure is explained in detail with respect to specific examples.

Example 1: Comparison Between Magnetic Devices

The experiment aimed at the investigation of capture efficiency and the formation of non-specific binding upon incubation of a cell suspension with paramagnetic particles by comparing two different magnetic devices.

Materials:
neodymium permanent magnet type 1 (column-like arrangement): field strength approx. 0.35 Tesla, column type shape, single unit: round, 24 mm in diameter and thickness 10 mm using 3 magnets to form a column in length of 30 mm (see waFIG. 1).
neodymium permanent magnet type 2: field strength 0.52 Tesla, squared in dimensions 30 mm×30 mm×30 mm, arranged as so called duopol magnet (see FIG. 1.)
Washing buffer solution: iso-osmolar phosphate buffered solution
super paramagnetic particles: FluidMag, nominal diameter 100 nm (chemicell GmbH, Germany)

Procedure Details

The arrangement of two parallel squared magnets of equal dimensions and opposite polarization and defined distance d to each other (see FIG. 2) constitutes a suited magnetic device to provide a high magnetic field gradient. The magnet geometry in particular the square form was chosen in expectation of maximal magnetic flow density. This magnetic arrangement is referred to as "duopole magnet" and generates a 10× higher maximum magnetic field gradient when compared to the single magnet in a location of a few millimeters outside the gap (gap 21 in FIG. 2) between the two single magnets, herein denoted as capture zone. The duopole magnetic device improves magnetophoric behavior of small magnetic particles in size of 100 nm to 250 nm, when compared to commonly used permanent magnets with column or squared geometry. The dimensions influence magnetic field strength as present in the incubation container, thus are chosen in accordance to the required incubation volumes in the assay. In one embodiment, the sample volume in a said incubation container measures a maximal 10 mm volume height or 500 µl then requiring a magnet in dimension optimally 3× this size of the sample volume for the magnet height, width and breadth therefore, measuring 30 mm×30 mm×30 mm.

The distance between the paired single unit magnets ("d" in FIG. 2) was determined in dependence of the dimensions of the sample container taking into consideration the spatial reduction in magnetic field gradient with increasing distance from the duopole magnet's capture zone. The procedure has been specifically developed for processing small volumes, as to allow usage of laboratory standard cylindrical 1.5 ml microcentrifuge plastic containers (~10.8 mm in diameter and ~42 mm in height). Therefore, with given magnetic susceptibility of magnetic particles and an incubation container diameter not exceeding 8 mm, a distance d of max. 3 mm seems favorable for the duopole magnet.

Lesser effective however, usable for the present incubation method are single unit magnets of various geometries, so for example a column type magnet. The magnetic capture zone is located either at the north or south pole of the magnet.

In capture efficiency experiments with magnetic particles immersed in common buffered suspensions, such as phosphate buffered solution supplemented with 0.5% BSA, we measured the duration of fractionation in dependence of the magnetic arrangement. In brief, 100 µg magnetic particles were immersed and mixed in 500 µl pH buffered solution and subjected to various magnetic fields as generated by the magnet arrangements in a 1.5 ml microcentrifuge plastic container. The time required to clear the solution from the particles by means of magnetic separation was recorded. The magnet arrangements included: (1) a column type permanent magnet with A) 10 mm height and B) 30 mm height, (2) a squared duopole magnet with a magnet pair gap d of C) 0 mm, D) 3 mm, and E) 10 mm.

Results

The experiments show fastest magnetic fractionation using the duopole magnet with magnet pair gap d equal to 0 or 3 mm. This indicates a higher magnetophoretic capacity when using this particular magnetic arrangement and translates into better control of the incubation process with respect to the control over magnetic particle movement. In conclusion, best results have been achieved for the duopole with 3 mm gap distance.

TABLE 2

Magnetic behavior in dependence of different magnet arrangements

| Magnet arrangement | Column type magnet heightened | | Duopole magnet gap distance (d) | | |
|---|---|---|---|---|---|
| | 10 mm | 30 mm | 0 mm | 3 mm | 10 mm |
| Fractionation duration in seconds | 130 | 100 | 45 | 45 | 100 |

Example 2: Capture Efficiency and Recovery of Target Blood Cells Using Anti-CD45 Reactive Magnetic Particles Materials:
incubation buffer solution: iso-osmolaric phosphate buffered solution supplemented with 3% fetal bovine serum.
washing solution: iso-osmolaric phosphate buffered solution
red blood cell lysis buffer: 154 mM $NH_4Cl$, 10 mM $NaHCO_3$, 2 mM EDTA
composite neodymium permanent magnet type 1 (common type): magnetic flux density 0.35 Tesla, single unit column type magnet measures 24 mm in diameter und 10 mm in height using 6 units (see FIG. 1)
neodymium magnet type 2: 0.52 Tesla, two paired squared magnet duopole arrangement 30 mm×30 mm×30 mm per unit (see FIG. 1)
microcentrifuge 1.5 ml plastic container use for incubation
1 ml plastic syringe
superparamagnetic particles reactive against CD45 as conjugated with anti-CD45 antibodies (SanoLibio GmbH, Munich, Germany).
whole blood from healthy adult donors stored for at most 24 hours in sodium heparin blood storage containers.
Enrichment device (SanoLibio GmbH, Munich, Germany)

Procedure

Prior to WBC enrichment from whole blood, red blood cells were lysed as known to the expert in the field via suited lysis buffers (RBC lysis buffer) and purified white blood cells were concentrated via centrifugation. The purified leukocytes were then subjected to incubation using the incubation buffer for 5 minutes at room temperature.

Further process steps were performed manually or according to the new process and employing the enrichment device. In all samples, anti-CD45 reactive magnetic particles were mixed with $5 \times 10^6$ leukocytes that were prepared as described in the previous section. All tests have been repeated in triplicates using 10 µl of the concentrated magnetic particle suspension (containing 3.25 µg anti-CD45 antibodies conjugated to magnetic particles) and adjusting cells in a total incubation volume of 60 µl per test. The capture efficiency was determined measuring the ratio between the non-magnetic or non-separable cell fraction as contained in the sample supernatant after magnetic separation and the initially counted cell amount. Cell counts were obtained using hemacytometer analysis under bright field microscope. As could be expected, the cells are contained partly in the supernatant and in the magnetic separated fraction after enrichment. The sum of both fractions shall be equal to the control count before enrichment in theory and can be understood as the total recovery, thus requiring a count of magnetic fraction as well. Therefore, the total recovery of leukocytes is determined by the ratio between the total cell count after enrichment (both fractions) and the initial control count. A reduced total recovery is indicative for cell loss by cell destruction.

A) For comparison with common method of magnetic labelling, the sample was incubated for 5 min at rest. Subsequent to magnetic incubation, 500 µl washing buffer was added and 3× mixed with the solution by pipetting then transferring the sample container to the magnetic separation step for 2.5 min using the duopole magnet type 2. This protocol required 8 minutes until completion.

B) Volumes and amounts were indifferent to the description of method A. In comparison to method A, the dynamic magnetic labelling method as described by Schreier et al. (Journal of Translational Medicine 15(1):6, 2017) has been tested. In doing so, samples were incubated in total for 5 min in the presence of a magnetic field gradient using magnet type 1 under constant rotation at 4 rounds per minutes. The incubation was separated in to 5 cycles, each comprising a 50 seconds incubation period and a 10 seconds mixing period then resulting in 5 minute total incubation time. Subsequently, the container was removed from the magnet. Magnetic labelling was followed by washing and magnetic separation as described in method A.

Volumes and amounts magnetic particles and cells as well as the duration of washing and magnetic separation procedure in test B correspond to those as used and performed in test A.

C) In the new procedure, magnetic particles were mixed by pipetting and dispensing with the sample suspension in the presence of a magnetic field gradient (magnet type 2) using the enrichment device. The distance between container and magnet was adjusted to 1 mm as to generate a high field gradient within the sample volume. During particle addition, the sample container was rotated at 300 rpm. The initial step of particle addition took not longer than 5 seconds.

Subsequent to magnetic particle addition, the incubation or magnetic labelling followed. Thereby, the sample suspension now containing the magnetic particles was incubated for in total 3.5 min in the presence of weaker magnetic field gradient hereby adjusting the distance between magnet and container to 3 mm. One incubation cycle lasted for 20 seconds whilst rotating the container at 2.5 rounds per minute and was followed by a mixing step. The step could be done manually or automated using the pipetting device. During mixing, the magnet field was minimized by increasing the container to magnet distance to approx. 10 mm. Therefore, one incubation cycle consisted of incubation and mixing and was repeated 7 times. Subsequent to magnetic labelling a short fractionation of magnetic material was carried out by allowing the cell suspension to rest for 40 seconds in the presence of the magnetic field, then removing the supernatant largely containing non or weakly magnetic material. The supernatant was kept in a separate container (transit container) until used for the final magnetic separation step. The magnetic incubation was followed by the washing of the magnetic fraction and was carried out by the addition of 100 µl washing buffer to and mixing with the magnetic fraction in the sample container in the presence of the strongest magnet field gradient then readjusting the magnet to container distance to 0 mm. The mixing was required to be thoroughly and was repeated. The resuspended suspension was again allowed to separate in the presence of a magnetic field for 15 seconds. This procedure was repeated 2 times summing up to 2 minutes of washing. Also, the rotation speed was increased to 300 rounds per minute during mixing as to support resuspension of particles and again reduced to 3.5 rounds per minute during the 15 seconds magnetic fractionation. The supernatant supposedly contained non-magnetic cells that have been washed out of the magnetic fraction. Each washing cycle produced 100 µl supernatant that has been removed and added into the said transit container leading to an accumulated supernatant fraction. The washed magnetic cell fraction was resuspended in 1 ml cell friendly buffer for further analysis (positive selection mode). The accumulated supernatant fraction as stored in the transit container comprising the original sample and 300 µl washing buffer and contains non or weakly magnetically separable cells. In particular the weakly separable cells can be further captured in a final more intensive magnetic separation step. In the method of the present disclosure, the accumulated supernatant was pipetted into the pipette device (1 ml syringe) adjusted to 1 ml using cell friendly buffer and rested in a high magnetic field gradient for 2.5 minutes. In doing so, the plastic syringe was placed attached to the magnetic gap into the capture zone (FIG. 1).

The magnetic separation was followed by draining the syringe thereby releasing the non-magnetic fraction only whilst the syringe being inclined at 45 degree. The entire process took approx. 8 minutes.

D) To test the influence of different magnetic field conditions on the enrichment outcome of the method of the present disclosure C, the under C described experiments were carried out yet using the magnet type 1, instead of type 2.

Results

Figure 6:
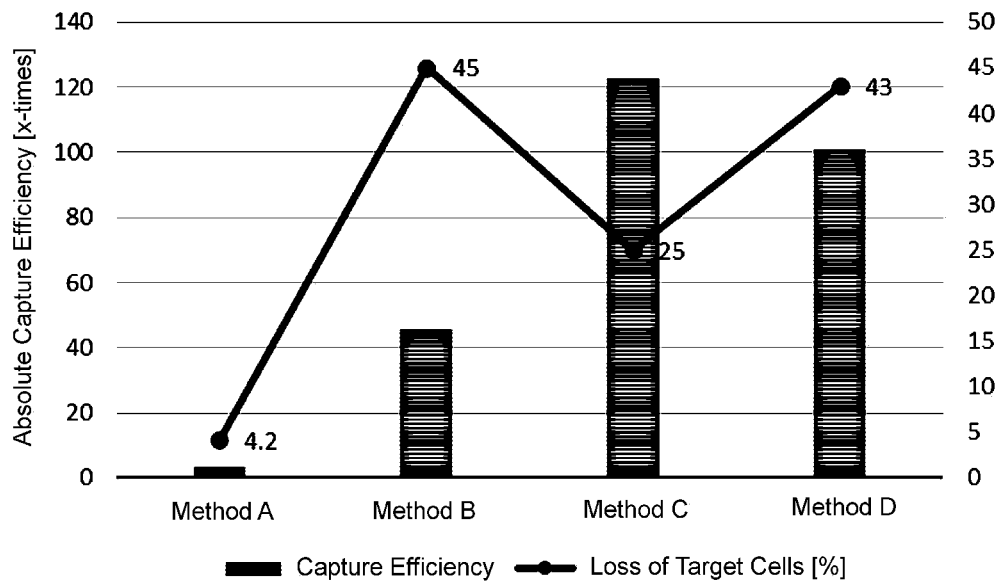
FIG. 6 shows the capture efficiency and the loss of targeted cells from the suspension relative to the incubation method according to Example 2.

This example intends to investigate the capture efficiency and the cell recovery or loss of target cells, respectively, in dependence of the method of incubation as listed from A to D. Loss of cells are ascribed to physical damage on the cell membrane as inflicted by the magnetic particles during incubation and magnetic separation. Thus, the cell loss positively correlates with the drag force of the magnetic particles in the presence of respective magnetic field gradients. Furthermore, this type of cell loss is indicative for amount and density of magnetic particles bound either specifically or non-specifically to the cell membrane. The level and distribution of magnetic particle labelling density can be qualified, given knowledge about the amount of magnetic particles and target cells in the system. In that sense, a high capture efficiency with total high recovery alludes to a high level and equal distribution of magnetic particle labelling density. In contrast, a low capture efficiency and high loss alludes to a highly uneven particle distribution across target cells. FIG. 6 shows the capture efficiency of the target cells being leukocytes in absolute values in dependence of the incubation methods A to D (cell counting was conducted using a bright field microscopy, Olympus BX50). Moreover, the chart contains information about the total recovery given in % of loss of target cells.

The total cell recovery or loss of target cells was highest or lowest, respectively, in case of incubation without influence of a magnetic field (Method A). In contrast Methods B and D showed highest target cell loss. Method C yielded moderate target cell loss. It is assumed that the low total cell recovery and also lower capture efficiency as obtained by using methods B and D are consequence of high magnetic particle labelling yet with most uneven distribution. When compared between methods B and D, method D achieved higher capture efficiency. Therefore, using a lower magnetic field strength magnet type when compared to method C seems to elicit significant higher particle labelling density. Nevertheless, the lowered total cell loss and the comparatively high capture efficiency as achieved with method C when compared to methods B and D, is indicative for increased specific binding. In general, one can notice that in contrast to method A (incubation at rest) the methods B, C and D achieved significant higher capture efficiency within shorter time. As expected, the magnetic labelling using methods B, C, and D are more efficient, resulting in a larger portion of cells being highly magnetized thus, exposed to higher magnetic force. Method C seems most suitable for showing highest capture efficiency as well as equal particle labelling distribution.

Example 3: Investigation of Irreversible Non-Specific Binding on Model Tumor Cells by Magnetic Particles Materials:
as used in Example 1 additionally:
Model tumor cells: MDA-MB-231 (ATCC, HTB-26)
unconjugated raw magnetic particles (chemicell GmbH, Berlin, Germany)

Experimental Procedure

A sample suspension was prepared and incubated as described in Example 1, yet containing $1 \times 10^4$ model tumor cells. It was presupposed that model tumor cells being contained in the magnetically separated fraction after 2.5 min of magnetic separation shall be considered irreversibly magnetized. Thus, the degree in non-specific binding can be expressed in capture efficiency. Moreover, the total cell recovery was recorded as described in Example 1. Therein, the cell amount as contained in the supernatant after magnetic separation was measured by a bright field microscope and hemocytometer (Neubauer).

A) The herein used method A corresponds to the method A as described in Example 2.
B) The herein used method B corresponds to the method B as described in Example 2.
C) The herein used method C corresponds to the method C as described in Example 2.

Results

The cell loss in % is shown in Table 3 and corresponds to the fraction of magnetic separable model tumor cells as caused by non-specific binding of the magnetic particles to the cells. Furthermore, the total cell recovery was determined by the sum of the cell counts in the magnetic and non-magnetic fraction after magnetic separation, respectively and calculated in reference to the initial cell amount before the procedure. It shall be noted that comparison between methods in particular the cell counts in the magnetic fractions is only feasible for high total recovery over 95% as otherwise the influence of cell destruction by magnetic beads affects result interpretation. The results indicate low cell destruction in all methods and can be expected when assuming low magnetic labelling density. The experiment design with respect to tumor cells, concentration and amount of magnetic particles and the type and duration of magnetic separation simulates a procedure for high capture efficiency situations potentially yielding up to 99%. Therefore, the particle amount was chosen to be very high and also promotes non-specific binding. The results show that method C produces significant lower non-specific binding when compared to the state of the art method B.

TABLE 3

| Method | Cell loss (cells in the magnetic separable fraction) | Cells in the supernatant (non-magnetic fraction) |
| --- | --- | --- |
| A | 5% | 98% |
| B | 36% | 64% |
| C | 8% | 94% |

Example 4: Particle Reactivity in Dependence of Target Cell Concentration

The experiment is essential for the optimization for the necessary limitation in amount of reactive surface as such magnetic particles in particular with respect to the reduction of non-specific binding. It is preferable to achieve equal or higher capture efficiency yet using lowered amounts of magnetic particles.

Materials
as in Example 2

Experimental Procedure

The experiment was carried out according to method C as described in Example 2, with the following changes: the magnetic particle amount was increased and corresponds to 3.75 µg particle bound antibodies supporting the magnetic capture of a greater amount of target cells. The incubation volume measured 100 µl per sample. The target cell amount was varied in range of $1.5 \times 10^5$ till $3 \times 10^7$ cells and corresponds to a target cell concentration of $1.5 \times 10^3$ to $3 \times 10^5$ leukocytes per µl. The capture efficiency was calculated as described in Example 2 counting the non-magnetic fraction after magnetic separation as contained in the supernatant in reference to the known leukocyte cell count before enrichment. The particle reactivity is the result of the amount of magnetically separable leukocytes normalized to 1 µl of used magnetic particle solution and thus, allows prospective determination of separable target cell amount per given magnetic particle amount.

Results

Figure 7:
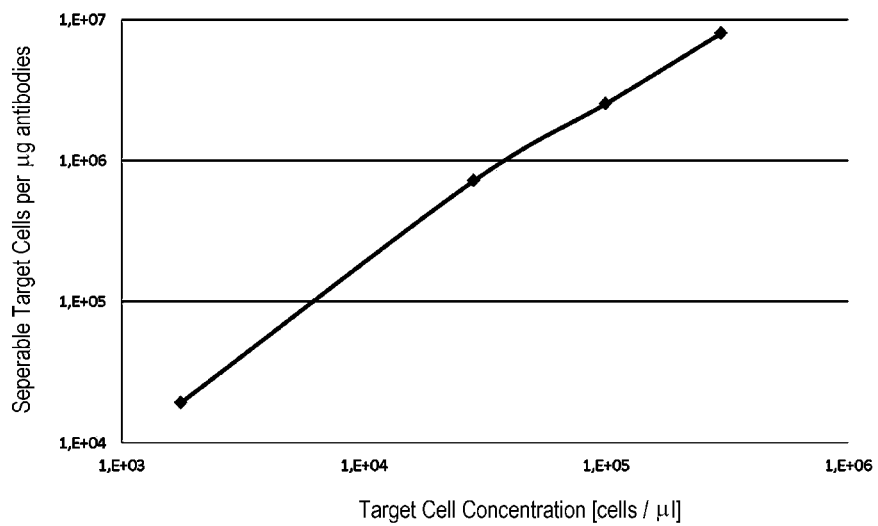
FIG. 7 shows the amount of separable cells per µg antibodies as a function of target cell concentration in the suspension according to Example 4.

It was noticed during previous experiments that in particular the new enrichment method C as described in Example 2 is sensitive to variations in incubation volume with respect to efficiency in magnetic labelling or consequently magnetic capture. A positive correlation between target cell concentration and particle efficiency has been observed and was used to reduce sample costs and sample volumes throughout the enrichment process. In other words, the reduction in incubation volume at equal target cell amount or increase in target cell amount at equal incubation volume results in increased particle efficiency. A higher particle efficiency means either higher capture efficiency or equal capture efficiency achievable whilst decreasing particle amount. Detailed experimentation revealed a linear association between target cell concentration and particle reactivity, as shown in FIG. 7. Interestingly, each sample target cell concentration achieved 95% to 97% capture efficiency. In the know of this linear correlation between required particle amount and target cell concentration, an accurate prediction (around 2% variation) of capture efficiency can be made in the know of the used particle amount, incubation volume and target cell concentration. Also, the required particle amount for a desired capture efficiency can be calculated in advance. However, upon system change in every aspect, a new calibration experiment is needed and done as described in this example.

FIG. 7 shows the target cell concentration as a function of particle reactivity. As can be expected, the highest measured particle efficiency was achieved when adjusting the target cells to the highest concentration. In that case 1 µg antibodies translates into a particle amount to capture up to $8 \times 10^6$ target cells using the described method.

Example 5: Enrichment Efficiency of a Negative Selection Procedure

The enrichment efficiency is expressed in the aspects of recovery and purity of desired cells in the enriched sample and can be estimated by using model cells in spiking experiments.

Materials:
as in Example 2 additionally:
cell friendly solution (DMEM, phenole-free, Gibco)
model tumor cells: MDA-MBA-231 (ATCC, HTB-26)
Dyeing reagents: CellTrace™ CFSE Cell Proliferation Kit, a-CD45PE (eBioscience), Hoechst, Hoechst DNA stain (Merck, Millipore)

Experimental Procedure

Leukocytes were prepared from healthy donor fresh blood and purified from red blood cells by suitable red blood cell lysis procedure and centrifugation. Nucleated cell numbers were determined by counting chamber method (similar to Example 2). As to assure unambiguous detection of model tumor cells in the enriched cell suspension consisting of mostly leukocytes and non-hematopoietic circulating rare cells (CRCs) after enrichment, the tumor cells have been dyed using green CSFE-fluorescence membrane stain prior to spiking. In detail, a cancer patient sample was simulated by spiking 100 green fluorescent model tumor cells into $3 \times 10^7$ leukocytes (equals 3-7.5 ml whole blood). The total purity of model tumor cells before enrichment measured 0.00033%. After spiking, the enrichment method C was applied to the sample solution in the same fashion as described in Example 2. The procedure was carried out three times along with changes in the incubation volume. Thereby, the in Example 4 described particle amount prediction method was used for this experiment seeking 98.5% capture efficiency. The calculated antibody amount measured 9.37 µg (antibody amount bound to magnetic particles).

The first incubation (first depletion round) of cells with magnetic particles was carried out in incubation buffer and a final volume of 150 µl. The experiment required the measurement of the model tumor cell concentration before enrichment thereby removing a small portion from the sample measuring 2.5 µl from in total 75 µl sample volume (prior to addition of magnetic particle solution). The 2.5 µl were diluted with 35 µl cell friendly solution and constitutes the control sample denoted as "pre sample enrichment" and was expected to contain 3 to 4 model tumor cells and $1 \times 10^6$ other nucleated cells. Assuming a capture efficiency of 98.5% after the first enrichment procedure, the sample may contain a carry-over leukocyte count of $4.5 \times 10^5$ cells, resulting in a theoretical purity of model tumor cells to measure 0.022%. The incubation volume was reduced to 50 µl by suited centrifugation during the second and third enrichment procedures as to maintain high particle reactivity. In application of our particle reactivity prediction theory as described in Example 4, one can expect significantly reduced particle reactivity due to reduced target cell concentrations during the second and third enrichment round. Also, the volume reduction to a few µl as to compensate the dramatically lowered target cell count is not feasible. For example, the estimated particle reactivity for the second enrichment round would measure $1.5 \times 10^5$ cells per µg antibody. In consequence, the residual amount of $4.5 \times 10^5$ leukocytes would require an antibody amount of 3.12 ug. For the third enrichment round, the particle amount prediction model is impractical having used an equal amount of magnetic particles as in the second enrichment round. The entire enrichment process was completed after 50 minutes. The control "pre-sample enrichment" as well as the sample after enrichment were adjusted equally to 30 µl volume following pelleting in by centrifugation and resuspension. For complete analysis, both cell suspension were stained with immunofluorescence dyes reactive against CD45 (yellow) and DNA (blue). Moreover, a separate control sample was prepared in parallel simulating the initial sample preparation, as to countercheck the correctness of the spiking concentration. This control sample contained only model tumor cells and was expected to count 100 cells thereof. The Operetta Image Scanning system was used for microscopic analysis. All three samples that include the spiking control, the pre-sample enrichment control and the after enrichment sample were further diluted to 70 µl and loaded into one well each of a 96-well plate and left for sedimentation for 10 min. Pictures were taken of the cell monolayer and entire well bottom area in each color channel including green, yellow and blue fluorescence emission. Subsequently, the pictures were used for manual analysis. The model tumor cell recovery rate was calculated by the ratio in cell model tumor cell counts between spiking control and sample after enrichment.

Results

The spiking control sample contained 114 green fluorescence model tumor cells and the sample after enrichment contained 109 green fluorescence model tumor cells, resulting in a recovery rate of 95.6%.

The depletion efficiency equates to the capture efficiency of magnetically separable target cells, herein leukocytes and is given in log numbers. For calculation of the leukocyte depletion efficiency, leukocyte concentrations in the sample "after enrichment" were determined. In the know of the leukocytes amount before enrichment, the depletion efficiency calculates as the ratio between the number of nucleated cells before and after enrichment. The amount of leukocytes before enrichment measured $3 \times 10^7$ cells. The amount of leukocytes after enrichment was estimated by counting cells from a statistical significant area of recorded microscopy pictures expecting equal distribution of cells at the bottom of the well and counted in total 2840 cells. Therefore, the depletion efficiency measures 4.02 log.

The enrichment efficiency is commonly accepted as "representative" for the quality of various enrichment procedures for taking into account cell recovery and capture efficiency in parallel. Therefore, the enrichment efficiency calculates as the ratio of purities between samples before and after enrichment. The amount of spiked model tumor cells can be derived from the spiking control and the sample before enrichment, respectively. Both samples should conclude with approx. the same count of spiked model tumor cells. The sample before enrichment counted 4 green fluorescent model tumor cells and results in 120 cells when extrapolated to the total volume of 75 µl. Also, the sample before enrichment counted $1.1 \times 10^6$ nucleated cells. Therefore, the purity of spiked model tumor cells before and after enrichment measured 0.00036% and 3.84%, respectively. Consequently, the enrichment efficiency measured 4.03 log. High enrichment efficiency often greater 4 log is necessary to achieve minimal required purity of desired cells as otherwise would be lost in noise or generate false positive signals. The CD45 negative selection assay carry over cell spectrum may also contain substantial amounts of non-hematopoietic cells (CD45 negative cells) that further decrease the purity of the desired cells. Most commonly, the 1% purity criterion has been mentioned, a threshold value to allow flawless molecular analysis of heterogeneous cell suspensions. In the present example, the additional amount of CD45 negative cells was counted and measured 710 cells resulting in an actual purity of model tumor cells of 3.07%.

TABLE 4

Result overview of the enrichment quality

| Enrichment Parameter | Value |
| --- | --- |
| Target cell amount (leukocyte) | $3 \times 10^7$ |
| Model tumor cell spike | 100 |
| Carry-over leukocytes after enrichment | 2840 |
| Depletion efficiency (=capture efficiency) | 4.02 log |
| Model tumor cell recovery | 95.6% |
| Model tumor cell purity after enrichment (against leukocytes) | 3.8% |

TABLE 4-continued

Result overview of the enrichment quality

| Enrichment Parameter | Value |
| --- | --- |
| Model tumor cell purity after enrichment (total) | 3% |
| Assay procedure duration | 55 min |
| Enrichment efficiency | 4.03 log |

Example 6: Analysis of Residual Whole Blood Cell Populations after CD45 Negative Selection Using the Dynamic Magnetic Labelling Procedure Materials:
  as in Examples 2 and 5
Example Procedure The enrichment followed as described in Examples 2 and 5. A whole blood amount of 4.9 ml venous peripheral blood was used and obtained from a healthy donor. The enriched cells in the sample were concentrated in 30 µl cell friendly solution and in this example dyed for subsequent fluorescence microscope analysis using Hoechst 33342 (fluorescent dye staining the cell nucleus in blue color emission), anti-CD45PE conjugate (identifies leukocytes, yellow color emission), anti-CD71FITC conjugate (identifies nucleated progenitors cells of the erythroid lineage, green color emission) and antiglycophorin-A-PercPCy5 conjugate (identifies cells of the erythroid lineage including red blood cells, red color emission). The enriched cell suspension was incubated with fluorescent stains for 30 minutes in the dark at 4° C. and subsequently washed using 1.5 ml cell friendly buffer, pelleted and resuspended in 70 µl phenol-free DMEM. The stained cells were analyzed by fluorescence microscopy within 30 minutes after preparation as described in Example 5 and transferred into a flat bottom well of a 96-well plate then recording the monolayer of cells at the well bottom using the Perkin Elmer Operetta Imaging system. Image recording was optimized with respect to camera exposure time and excitation intensity consequently limiting the so called channel bleeding.

Results

The enriched sample contained four major nucleated cell populations. The frequency of individual populations was determined by manual differential counting of in total 75% of the recorded well bottom area or in other words 265 out of 355 captured fields then extrapolating cell numbers to the complete bottom well area. Having used 4.9 ml, the count was normalized to 1 ml. Major populations are represented by leukocytes counting 127 cells per ml, bare nuclei counting 42 cells per ml and erythroblasts, counting 3.1 cells per ml. The depletion rate as calculated in log from the ratio before and after enrichment measured 4.7 log. The cell populations after enrichment are summarized in table 5.

TABLE 5

CD45 depletion efficiency

| Before enrichment | $3.0 \times 10^7$ |
| --- | --- |
| After enrichment | 620 |
| Depletion factor | $4.48 \times 10^4$ |
| Depletion in log number | 4.7 log |
| Remaining nucleated cell populations | |
| Leukocytes | 66.0% |
| Bare nuclei | 22.2% |

TABLE 5-continued

CD45 depletion efficiency

| Undefined CD45-negative cells | 10.2% |
| --- | --- |
| Erythroblasts | 1.6% |

Example 7: Comparison of Rare Cell Profiles after CD45 Depletion Between Healthy Donor and Cancer Afflicted Blood Donations Using Fluorescence Microscopy and Common Cell Markers Materials
  as in Example 5
Example Procedures The enrichment was carried out as described in Examples 2 and 5 with respect to enrichment and cell staining and as described in Example 6 with respect to analysis.

Results

In general, enrichment shall be understood as a means to allow analysis of the rare cell spectrum using commonly applied cell analysis tools. The higher the enrichment efficiency, the purer are the desired cell populations and the higher is the chance of identification. Enrichment procedures in the range of 4 to 5 log are well suited for the detection of a few desired cells in several milliliters of blood. With regard to rare cell analysis purposed for diagnostics, it is the idea to mirror tissue section cell analysis. Therein, stained tissue sections are investigated for the presence of certain abnormal cell features. Often, more than 10 cellular parameters are used to characterize a tissue section. Consequently, the analytical procedure in rare cell analysis is similar to the tissue section analysis. In cancer patients, the leukocyte depleted sample presents at best a complete set of rare cells that may comprise benign and malignant cell types. Therefore, the exposed spectrum of rare cells represent a virtual cut section through the blood tissue. In this example, a selection of cellular markers have been employed to indicate cells that allow interpretation of tumorous growth and also bone marrow damage in cancer patients. Thereby, healthy and afflicted individuals differ in the presence of cell abnormality with respect to cancer.

Figure 8:
FIG. 8 shows a large, alleged mitotic cell isolated from a stomach cancer patient from Example 7.
Figure 9:
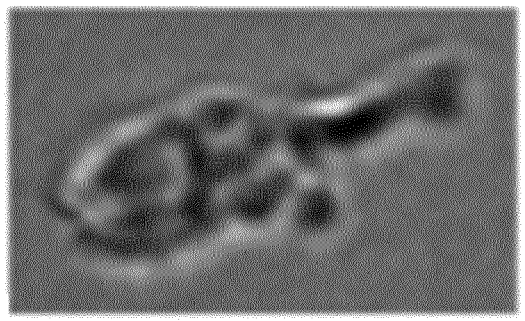
FIG. 9 shows a circulating epithelial cells (CECs) of cancer patient from Example 7.
Figure 9:
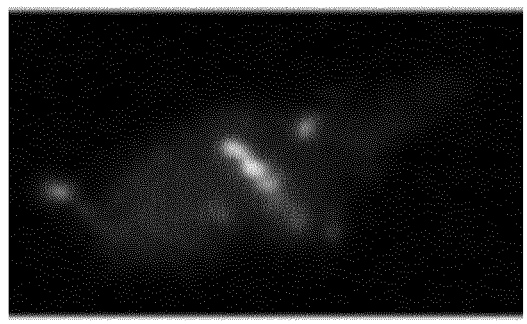
Figure 9:
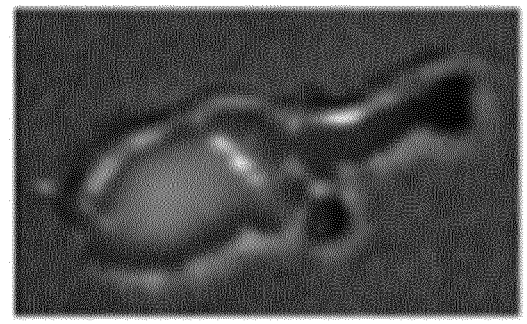

However, at current state of the art, there is little diagnostic meaning to abnormality with respect to findings of certain rare cells apart from the circulating epithelial cells (CECs). Herein included criteria for cell analysis comprise CECs, erythroblasts and abnormal CD45-negative cells with respect to nuclear appearances. Most commonly, findings of CECs are largely uncommon in healthy individuals at concentrations levels greater 1 cell per ml then indicating the presence of non-physiological conditions (FIG. 9). Also, mitotic or polyploidic non-hematopoietic cells are absent in the circulation of healthy individuals and shall be described as active cells indicating abnormality. FIG. 8 shows a large non-hematopoietic bi-nucleated cell with a nucleus bridge derived from a patient with stomach carcinoma. Less indicative is the presence of large non-hematopoietic circulating cells in size often greater 13 µm. In the following, a list of rare cells found in two cancer patients and two healthy individuals is given (table 6). When tested, the cancer patients already underwent neoadjuvant therapy. According to rare cell profiles of the two groups, healthy and afflicted, a clear distinction could be made. Particularly, the cancer patients showed positive events of circulating epithelial cells CECs. Moreover, the breast cancer patient showed a noticeable high number of intact erythroblasts.

TABLE 6

Frequency of certain rare cells per ml blood in various donor types

| Sampled individual | Circulating epithelial cells (CECs) | erythroblasts | CD45 negative active cells |
|---|---|---|---|
| Advanced stomach cancer | 2.4 | 15.4 | 0.6 |
| Breast cancer, Hormon positive, locally advanced | 0.3 | 445 | 0.3 |
| Healthy donor 1 | 0 | 0.46 | 0 |
| Healthy donor 2 | 0 | 0.47 | 0 |

REFERENCE SIGNS 10 magnetic labelling device
11 incubation container
12 cylindrical sheathing of the incubation container
13 conical bottom of the incubation container
14 longitudinal axis of the incubation container
15 rotatable mount of the incubation container
16 drive equipment
17 permanent magnet
18 longitudinal axis of the permanent magnet
h height of the permanent magnet
19 first pole of the permanent magnet
2 second pole of the permanent magnet
21 gap of the duopole permanent magnet
d gap distance of the duopole permanent magnet
22 plastic syringe
23 mount of the plastic syringe
24 mount of another incubation container
25 magazine for container empty or filled with various fluids
26 additional incubation container
27 container with fluids
28 main body of the plastic syringe 22
29 cylindrical sheathing of the main body 28
30 drainage of the syringe
31 round-bodied passage area
32 magnetized cell fraction
33 supernatant

The invention claimed is:

1. A method for the isolation of desired cells from a heterogeneous sample solution containing non-magnetic biological material including desired and undesired cells, comprising the steps of:
    establishing an adjustable external magnetic field gradient;
    adding magnetic or magnetizable particles to the sample solution while said sample solution is subjected to said established external magnetic field gradient, wherein said particles have sizes in a range from 100 nm to 4 um and exhibit surface components which support specific association with said desired or undesired cells forming desired or undesired target cells;
    decreasing said external magnetic field gradient;
    incubating said sample solution with said magnetic particles to obtain a magnetized cell fraction of said desired or undesired target cells while said sample solution is subjected to said decreased external magnetic field gradient;
    washing said magnetized cell fraction of said desired or undesired target cells using a washing solution to reduce non-specific binding while said sample solution is subjected to said decreased external magnetic field gradient;
    increasing said external magnetic field gradient;
    separating said magnetized cell fraction of said desired or undesired target cells from said sample solution while said sample solution is subjected to said increased external magnetic field gradient; wherein said sample solution is rotated at least during said adding, incubating and washing steps.

2. The method of claim 1, wherein said sample solution is provided in a sample container which is rotated concentrically at different speeds during said adding, incubating and washing steps.

3. The method of claim 1, wherein the incubation step consists of several incubation cycles, wherein each incubation cycle comprises:
    a magnetic labelling step at a slow rotational speed of the incubation container that is slower than a fast rotational speed during addition of the particles for the purpose of generating a magnetic particle bound cell fraction; and
    a mixing step to establish an equal distributions in the heterogeneous sample suspension as present after said magnetic labelling step.

4. The method of claim 3, wherein said magnetic field gradient is further decreased between said magnetic labelling step and said mixing step and, when an incubation cycle is repeated, increased again before the subsequent labelling step.

5. The method of claim 1, wherein the washing and magnetic separation steps comprises one or more washing and magnetic separation cycles, wherein each washing and magnetic separation cycle comprises the following steps: removal of the supernatant from the magnetically separated cell fraction; resuspension of the magnetically separated cell fraction in iso-osmolaric washing solution that is low or void of protein and in the presence of a weak magnetic field gradient that is lower than magnetic field gradient applied during the incubation step, wherein the container is rotated at a high speed that is higher than the rotation speed applied during the incubation step; magnetic separation of the magnetically labelled cell fraction within the cell suspension as a consequence of a high magnetic field gradient that is higher than the magnetic field gradient applied during the incubation step and at a medium rotation speed that is lower than the fast rotation speed during the preceding resuspension step.

6. The method of claim 1, wherein in the magnetic separation step, the target cells are fixed magnetically and a remaining suspension is removed from the fixed target cells.

7. The method of claim 6, wherein the target cells include the desired cells.

8. The method of claim 6, wherein the removed remaining suspension includes the desired cells.

9. The method of claim 1, wherein said magnetic or magnetizable particles comprise superparamagnetic materials.

10. The method of claim 1, wherein the sample is incubated in a buffered solution prior to addition of magnetic or magnetizable particles that contains macromolecules for saturation of non-specific binding sites.

* * * * *